(12) United States Patent
Chesneau et al.

(10) Patent No.: US 11,744,264 B2
(45) Date of Patent: Sep. 5, 2023

(54) METHOD FOR TREATING HIGH-PROTEIN GRAINS WITH A VIEW TO IMPROVING THE USE THEREOF AS FOOD

(71) Applicant: VALOREX, Combourtille (FR)

(72) Inventors: Guillaume Chesneau, Luitre (FR); Mathieu Guillevic, Rennes (FR); Antoine Germain, Cesson Sevigne (FR); Hervé Juin, Péré (FR); Michel Lessire, Nouzilly (FR); Patrick Chapoutot, Franconville (FR); Pierre Noziere, Tallende (FR); Christine Burel, Ahetze (FR); Etienne Labussiere, Cintre (FR)

(73) Assignee: VALOREX, Combourtillé (FR)

( * ) Notice: Subject to any disclaimer, the term of this patent is extended or adjusted under 35 U.S.C. 154(b) by 1 day.

(21) Appl. No.: 16/766,165

(22) PCT Filed: Nov. 20, 2018

(86) PCT No.: PCT/EP2018/081972
§ 371 (c)(1),
(2) Date: May 21, 2020

(87) PCT Pub. No.: WO2019/101752
PCT Pub. Date: May 31, 2019

(65) Prior Publication Data
US 2021/0145023 A1      May 20, 2021

(30) Foreign Application Priority Data

Nov. 21, 2017 (FR) ..................... 1760978

(51) Int. Cl.
*A23K 10/30* (2016.01)
*A23K 30/00* (2016.01)
*A23K 10/14* (2016.01)

(52) U.S. Cl.
CPC .............. *A23K 10/30* (2016.05); *A23K 10/14* (2016.05); *A23K 30/00* (2016.05)

(58) Field of Classification Search
CPC ........ A23K 10/30; A23K 10/14; A23K 30/00; A23L 11/30; A23J 1/14; A23J 1/148; A23V 2002/00; A23V 2250/548; A23V 2300/24
(Continued)

(56) References Cited

U.S. PATENT DOCUMENTS

2005/0136162 A1 * 6/2005 Kvist ...................... A23J 1/148
426/52

FOREIGN PATENT DOCUMENTS

FR      3040588 A1      3/2017
WO   2015158959 A1    10/2015

OTHER PUBLICATIONS

Luo et al. Journal of Food 11:1 43-49 (2013) (Year: 2013).*
(Continued)

*Primary Examiner* — Subbalakshmi Prakash
(74) *Attorney, Agent, or Firm* — Panitch Schwarze Belisario & Nadel LLP; Erin M. Dunston

(57) ABSTRACT

The present invention relates to a process for treating protein-rich seeds, these seeds being selected from at least one of the following seeds: fava beans, peas, white lupin, blue lupin, yellow lupin.
characterized in that it comprises in particular the following successive steps:
a) use of seeds of at least one of the abovementioned plant species, provided that these seeds have a protein content, and/or a starch content, and/or a fat content, of a value greater than or equal to a predetermined value,
and, at least one of the compounds from the following group: antinutritional factor (ANF), crude cellulose, neutral detergent fiber (NDF), in a content below a predetermined level;

(Continued)

| Characteristics of the treated fava bean seeds | | | |
|---|---|---|---|
| | Soybean meal | Fava bean Whole Raw | Fava bean Whole Cooked | Fava bean Kernel Cooked |
| Lectins, g/100 g DM | | 6.7 | 0.2 | 1.3 |
| Antitryptic factors, TIU/mg | | 6.6 | 0.8 | 2.8 |
| Allergic reactivity of dogs | | | | |
| Qualification of the reaction | Strong | Strong | None | None |
| Immunoblot | | | | | b) pressurizing the seeds from step a) for more than 10 seconds at a minimum pressure of 10 bars until a temperature of more than 80° C. is reached.

17 Claims, 1 Drawing Sheet

(58) Field of Classification Search
USPC .......................................................... 426/46
See application file for complete search history.

(56) References Cited

OTHER PUBLICATIONS

Pan et al., "Changes in kernel morphology and starch properties of high-amylose brown rice during the cooking process" Food Hydrocolloids, 10 pages (2016).
Perrot, "The proteins of peas from their function in the seed to their use in animal feed", 8(3) Animal prductions 151-164 (1995) (English Abstrct Only).
Pisarikova et al., "Nutritional Value of Lupine in the Diets for Pigs (a Review)", 78 Acta Vet. Brno 399-409 (2009).
Principles of Cereal Science and Technology Third Edition, 222 pages.
Saez et al., "Effects of dehulling, steam-cooking and microwave-irradiation on digestive value of white lupin (*Lupinus albus*) seed meal for rainbow trout (*Oncorhynchus mykiss*) and Atlantic salmon (*Salmo salar*)", 69(2) Archives of Animal Nutrition 143-157 (2015).
Saini, "Legume Seed Oligosaccharides", N.S.W. Agriculture & Fisheries 329-341 (1989).
Schmidt et al., "Comparison of a modern broiler line and heritage line unselected since the 1950s", 88 Poultry Science 2610-2619 (2009).
Schneider et al., "Oleagineux et proteagineux : Concilier l'attenuation du changement climatique et la necessite de s'y adapter", OCL, 3 pages (2017).
Svihus et al., "Effect of starch granule structure, associated components and processing on nutritive value of cereal starch: A review", 122 Animal Feed Science and Technology 303-320 (2005).
Svihus, "The role of feed processing on gastrointestinal function and health in poultry", Avian Gut Function in Health and Disease, Chapter 12 183-194 (2006).
Wang et al., "Molecular disassembly of rice and lotus starches during thermal processing and its effect on starch digestibility", 7 Food Funct. 1188-1195, (2016).
Wang et al., "Molecular disassembly of starch granules during gelatinization and its effect on starch digestibility: a review", 4 Food & Function 1564-1580 (2013).
Wang et al., "Multi-Scale structural changes of wheat and yam starches during cooking and their effect on in vitro enzymatic digestibility", Journal of Agricultural and Food Chemistry, 37 pages (Dec. 13, 2016).
Zdunczyk et al., "Effect of dehulling white lupin (*Lupinus albus*) on protein utilization by rats", 5 Journal of Animal and Feed Sciences, 281-288 (1996).
Zhang et al., "Detection of a Novel Three Component Complex Consisting of Starch, Protein, and Free Fatty Acids", 51 Journal of Agricutural and Food Chemistry 2801-2805 (2003).
Zhou et al., "Multi-scale structural and digestion properties of wheat starches with different amylose contents", 49 International Journal of Food Science and Technology 2619-2627 (2014).
Zuidhof et al., "Growth, efficiency, and yield of commercial broilers from 1957, 1978, and 2005", 93 Poultry Science 1-13 (2014).
Akraim et al., "Effects of preconditioning and extrusion of linseed on the ruminal biohydrogenation of fatty acids", 55 Anim. Res. 83-91 (2006).
Behnke, "Factors Influencing Pellet Quality", Department of Grain Science and Industry (2001).
Benchaar et al., "Effect of Extruding Horsebeans at 195° C on Protein Behaviour in the Digestive Tract of Lactating Cows" Angers 491-492, (1992) (English Abstract Only).
Bond, "In vitro digestibility of the testa in tannin-free field beans (*Vicia faba* L.)", 86 J. Agric. Sci., Camb. 561-566, (1976).
Bourin et al., "Alimentation 100% Bio Pour Les Poules Pondeuses: Resultat d'essais conduits en station experimentale", Restitution des programmes Kopp 1-9 (2015).
Bush et al., "Effects of Raw Pea Flour on Nutrient Digestibility and Immune Resonses in the Preruminant Calf", 75(12) J Dairy Sci. 3539-3552 (1992).
Carre "Yield and composition of cell wall residues isolated from various feedstuffs used for non-ruminant farm animals", 37 Journal of the Science of Food and Agriculture 341-351 (1986).
Carre et al., "Prediction of metabolisable energy value of broiler diets and water excretion from dietary chemical analyses", 7(8) Animal 1246-1258 (2013).
Champ et al., "Importance de L'endommagement de l'amidon dans les aliments pour animaux", 6 (3) Inra Prod. Anim. 185-198 (1993) (English Abstract Only).
Chesneau et al., "Impact of the Technological parameters of cooking-extrusion of flax seeds on the fatty acid composition of muscle and adipose tissue in pork butchering", 41(2) Journees Recherche Porcine 1-2 (2009) (English Abstract Only).
Choubert et al., "Digestibility in Fish: Improved Device for the Automatic Collection of Feces" 29 Aquaculture 185-189 (1982).
Crepon et al., "Nutritional value of faba bean (*Vicia faba* L.) seeds for feed and food", 115 Field Crops Research 329-339 (2010).
Cuq et al., "State diagrams to help describe wheat bread processing", 38 International Journal of Food Science and Technology 759-766 (2003).
Delanoue et al., "Society's stakeholders' points of view and expectations towards livestock farming. A view on the main controversies", 22 Renc. Rech Ruminants 171-178 (2015) (English Abstract Only).
Diaz et al., "Pea seeds (*Pisum sativum*), faba beans (*Vicia faba* var. minor) and lupin seeds (*Lupinus albus* var. multitalia) as protein sources in broiler diets: effect of extrusion on growth performance", 5 Italian Journal Animal Science 43-53 (2006).
Dixon et al., "Nutritional Value of Grain Legumes for Ruminants" 5 Nutrition Research Reviews 19-43 (1992).
Duc et al., "Genetic variability for feeding value of faba bean seeds (*Vicia faba*): Comparative chemical composition of sogenics involving zero-tannin and zero-vicine genes" 133 Journal of Agricultural Science 185-196 (1999).
Enjalbert et al., "Effects of preconditioning on structural availability and in vitro ruminal biohydrogenation of fat from extruded linseed", INRA, 1 page (2008).
Fru-Nji et al., "Effect of Graded Replacement of Soybean Meal by Faba Beans (*Vicia faba* L.) or Field Peas (*Pisum sativum* L.) in Rations for Laying Hens on Egg Production and Quality", 44 The Journal of Poultry Science 34-41 (2007).
Garrido et al., "Relationship Between Tannin Content and "In Vitro" Nutritive Value in Seeds of 24 Strains of *Vicia faba* L." 160-163 (1989).
Gatel, "Protein quality of legume seeds for non-ruminant animals: a literature review", 45 Animal Feed Science and Technology 317-348 (1994).
Gatta et al., "Influence of partial replacement of soya bean meal by faba beans or peas in heavy pigs diet on meat quality, residual anti-nutritional factors and phytoestrogen content", 67(3) Archives of Animal Nutrition 235-247 (2013).
Gourdouvelis et al., "Energy Value and Amino Acid Bioavailability of Faba Bean Seeds in Broilers Diets" 2 Journal of Agricultural Science and Technology 161-167 (2012).
Guillaume et al., "Use of field beans (*Vicia faba* L) in diets for laying hens", 18 British Poultry Science 573-583 (1977).
Hamblin, Lymphokines, 2(1) Journal of Molecular Recognition (1989).
Hayashi et al., "Increased Amylase Digestibility of Pressure-treated Starch", 53 (9) Agric. Biol. Chem., 2543-2544 (1989).

(56) References Cited

OTHER PUBLICATIONS

Hurtaud et al., "Effect of different forms of flax seeds and rapeseeds in dairy cow feeding on the physical and sensory properties of butter" 13 Renc. Rech. Ruminants (2006).

Jezierny et al., "The use of grain legumes as a protein source in pig nutrition: A review", 157 Animal Feed Science and Technology 111-128 (2010).

Kaysi et al., "Mechanical, Hydrothermal and thermal treatments are available to remove or inactivate antinutritionnal factors of pulses and/or to increase the availibility of some seed components", 5(1) INRA Prod. Anim 3-17 (1992) (English Abstract Only).

Keetels, "Retrogradation of Concentrated Starch Systems; Mechanism and Consequences for Product Properties", Wageningen Agricultural University (1995).

Khamassi et al., "A baseline study of vicine—convicine levels in faba bean (*Vicia faba* L.) germplasm", Plant Genetic Resources: Characterization and Utilization 1-8 (2013).

Laplace et al., "Measurement of precaecal dietary protein and plant cell wall digestion in pigs; comparison of four surgical procedure for ileorectal anatomosis", 40 Livestock Production Science 313-328 (1994).

Leclercq et al., "Utilisation de la graine de colza en aviculture", 2(2) INRA Prod. Anim., 129-136 (1989).

Lessire, "Dietary Fats and poultry fatty acid composition", 14 INRA Productions Animales, 365-370 (2001) (English Abstract Only).

Liener et al., "The Lectins Properties, Functions, and Applications in Biology and Medicine" 606 pages (1986).

Liener et al., "Significance for Humans of Biologically Active Factors in Soybeans and Other Food Legumes", 56 J. Am. Oil Chemists' Soc 121-129 (1979).

Magrini et al., "Why are grain-legumes rarely present in cropping systems despite their environmental and nutritional benefits? Analyzing lock in the French agrifood system", 126 Ecological Economics 152-162 (2016).

Mariotti et al., "Influence of the Heating Rate on the Pasting Properties of Various Flours", 57 Starch 564-572, (2005).

Martin et al., "Methane output and diet digestibility in response to feeding dairy cows crude linseed, extruded linseed, ar linseed oil", 86 Journal of Animal Science 2642-2650 (2008).

Martin-Tanguy et al., "Condensed Tannins in Horse Bean Seeds; Chemical Structure and Effects on the Food Value of the Horse Bean In Growing Poultry" 162-183, (1977).

Masoero et al., "Effect of extrusion, espansion and toasting on the nutritional value of peas, faba beans and lupins", 4(2) Italian Journal of Animal Science 177-189 (2005).

Meynard et al., "La diversification des cultures: lever les obstacles argronomiques et economiques", ResearchGate 105 pages (2014).

Muduuli et al., "Effect of dietary vicine and vitamin E supplemention on the productive performance of growing and laying chickens" 47 Br. J. Nutr. 53-60 (1982).

Muduuli et al., "Effect of Dietary Vicine on the Productive Performance of Laying Chickens", 61 Can. J. Anim. Sci. 757-764 (Sep. 1981).

Myer et al., "Miscellaneous Feedstuffs", CRC Press LLC (2001).

Noblet et al., "Energy value of linseed in pigs: impact of extrusion technology", 40 Journees de la Recherche Porcine 203-208 (2008) (English Abstract Only).

Normand et al., "Production of beef meat supplemented with n-3 polyunsaturated fatty acids from linseed: which form and which quantity for linseed supplementation? What effects on meat quality? ", 12 Renc. Rech. Ruminants 359-366 (2005).

Olabora et al., Purification, Identification and Quanification of the Egg-weight-depressing Factor (Vicine) in Fababeans (*Vicia faba* L.), 32 J. Sci. Food Agric. 1163-1171 (1981).

Olkowski et al., "Lupin as primary protein source in young broiler chicken diets: Effect of enzymes preparations catalyzing degradation of non-starch polysaccharides or phytates", 27(2) World Journal Microbiol Biotechnol 341-347 (Jun. 2011).

Opazo et al., "Reduction of Soybean Meal Non-Starch Polysaccharides and a-Galactosides by Solid-State Fermentation Using Cellulolytic Bacteria Obtained from Different Environments", 7(9) PLOS one e44763, 10 pages ( 2012).

\* cited by examiner

|  | Characteristics of the treated fava bean seeds ||||
|---|---|---|---|---|
|  | Soybean meal | Fava bean Whole Raw | Fava bean Whole Cooked | Fava bean Kernel Cooked |
| Lectins, g/100 g DM |  | 6.7 | 0.2 | 1.3 |
| Antitryptic factors, TIU/mg |  | 6.6 | 0.8 | 2.8 |
|  | Allergic reactivity of dogs ||||
| Qualification of the reaction | Strong | Strong | None | None |
| Immunoblot |  |  |  |  |

METHOD FOR TREATING HIGH-PROTEIN GRAINS WITH A VIEW TO IMPROVING THE USE THEREOF AS FOOD

CROSS-REFERENCE TO RELATED APPLICATIONS

This application is a U.S. National Stage Application pursuant to 35 U.S.C. § 371 of International Patent Application PCT/EP2018/081972, filed on Nov. 20, 2018, and published as WO 2019/101752 on May 31, 2019, which claims priority to French Patent Application 1760978, filed on Nov. 21, 2017, all of which are incorporated herein by reference in their entireties for all purposes.

FIELD OF THE INVENTION

The present invention relates to a process for treating protein-rich seeds to enhance their value as food, in particular for animals.

BACKGROUND OF THE INVENTION

The feeding of monogastric livestock such as broiler and laying poultry, pigs and ruminants is highly dependent on the inclusion of soybean meal in rations. This raw material comes mainly from South America, which is not without its difficulties in terms of protein autonomy and sustainability, due in particular to competitiveness issues in connection with strong societal and environmental expectations.

Due to its high protein content, soybean meal has established itself widely as a source of protein for animal feed. Today, soybean meal used in France is mostly imported and GMO, and its traceability is questioned (Gourdouvelis et al., 2012).

At the same time, new societal expectations are emerging in France (food diversity, product origin, environmental impact, product quality) and today, the use of soybean in animal production is threatened by the risk of a new societal crisis (Delanoue et al., 2015).

In animal husbandry, the satisfaction of protein requirements is essential to achieve zootechnical performance objectives. However, nearly half of the protein-rich raw materials for animal nutrition in France are imported, most of which corresponds to more than 3 million tons of soybean meal per year (Bouvarel et al., 2014).

Due to Asia's increasing imports, the relative scarcity and volatility of soybean prices is impacting farmers' incomes. Consequently, one of the major challenges for animal production is to become less dependent on soybean meal and therefore to find alternatives to reduce the need to import it (Bourin and Bouvarel, 2015), while ensuring the economic profitability of farms, particularly by seeking to optimize the performance of their production tools, but also to take greater advantage of their products.

Moreover, for pets such as dogs and cats, their owners are very concerned about the quality of the food they buy for them, in particular to give them vitality and to protect them from certain metabolic and digestive diseases or allergies.

Two-thirds of human protein requirements are covered by proteins of animal origin in Western countries. But a new vegetarian demand is emerging and the introduction of protein-rich seeds directly into the human diet is becoming increasingly important. Soybeans account for the bulk of this supply but, for the same physiological reasons as in animals, humans should be able to have access to vegetable protein sources in the form of seeds with improved nutritional value. Therefore, what is described below for animals is also true for humans. In the lines below and the claims, it must be understood that man belongs to the monogastric mammalian animals.

In France, there is a lack of diversity within crops, which are mainly cereals and whose protein yields are guaranteed by the use of nitrogen fertilizers and pesticides (Messéan et al., 2014). Farmers are thus looking for high-performance, sustainable and viable cropping systems, thanks to new crop rotation heads that consume less inputs (nitrogen fertilizers, pesticides) and remunerative prices, among other things.

Many challenges are on the agenda to meet the multiple expectations of consumers and citizens, namely:
  A sustainable diet with nutritional benefits, more naturalness and biodiversity and wide accessibility;
  The local origin of agricultural and food production;
  Non-GMO modes of production;
  Preservation of the environment with less greenhouse gas emissions, use of phytosanitary products, etc.

Finally, each link in the food chain expresses expectations that can be summarized as follows:
  Farmers: extend crop rotations, diversify crop rotation, make their production system more robust;
  Livestock farmers: local production and consumption of protein in animal rations;
  Pet owners: a balanced and healthy diet;
  Consumers: consume "locally", without GMOs, with more nutritional density.

But there are others, of great influence, expressed by:
  Institutions: limiting the use of soybean imports, nitrogen fertilizers and pesticides, and increasing French and European production of plant proteins;
  Companies throughout the food chain: in search of differentiation and added value in a tense economic context;
  Para-agricultural enterprises: constitute a wide network of services and products.

Many avenues can provide partial solutions to meet these many expectations, including:
  for the consumer, for example:
  organic production . . . but it is not affordable enough to satisfy the largest number of consumers.
  for breeders, for example:
  grass or legume forages as a substitute for corn silage, but this will only be a partial substitution on many dairy farms.
  co-products such as grains or oilcake also provide additional protein, but they must be limited to remain efficient;
  synthetic amino acids represent another form of contribution and strategy, but only address the primary concerns of farmers, not those of growers and consumers.
  for farmers, for example:
  some regions have other crop rotation heads than cereals and oilseeds, such as beetroot, potatoes, fiber flax . . . but they are very insufficient to satisfy individual French farmers.

These examples show that each link, separately, can provide some solutions, but they remain partial in relation to the many expectations mentioned above, and above all not integrated upstream and downstream, which does not make it possible to bring added value to the products of our farmers and stockbreeders, particularly in terms of having consumer and citizen benefits recognized.

Nevertheless, an integrated solution seems to have great potential for "satisfying" our fields, troughs and plates.

Indeed, protein crops or pulses could be an interesting strategy for crop diversification (grown alone or in association with annual cereals), while meeting the demand for protein autonomy of livestock farms and territories.

The integration of legumes in crop rotations is interesting from an agronomic point of view, in both conventional and organic systems, and contributes to the reduction of global warming (Magrini et al., 2016, Schneider et al., 2017).

Indeed, they are able to fix atmospheric nitrogen in the soil thanks to the bacteria contained in the nodules of their roots, limiting the use of nitrogen fertilizers which are responsible for half of the greenhouse gas emissions from agriculture.

On the other hand, legumes are also of agronomic and economic interest by improving plant performance and reducing input costs (Magrini et al., 2016, Schneider et al., 2017). The insertion of legumes favors the yield of the following cereals. Thus by retaining only the "yield" and "reduced nitrogen fertilization" effects, the gain in gross margin of a wheat after having grown protein crops (known as protein-wheat) is of the order of +160 €/ha compared to a wheat-wheat (i.e. a wheat crop following a previous wheat crop) (Terres Univia, 2016, Magrini et al., 2016).

Protein-rich seeds are an important source of protein and energy, in the form of starch in the case of peas and fava beans. In addition, these proteins are rich in amino acids such as lysine compared with those of cereals, which reinforces their value in balancing animal rations.

The nutritional values of protein-rich pea, fava bean and lupin seeds are presented in the table below.

|  | PEA | Colored FAVA BEAN | White LUPIN | Yellow LUPIN | Blue LUPIN |
| --- | --- | --- | --- | --- | --- |
| Dry matter (%) | 86.4 | 86.5 | 88.1 | 88.8 | 90.3 |
| Crude protein (%) | 20.7 | 25.4 | 33.4 | 37.5 | 30.3 |
| Raw fat (%) | 1.0 | 1.3 | 8.4 | 4.8 | 5.4 |
| Raw cellulose (%) | 5.2 | 7.9 | 12.0 | 14.7 | 14.2 |
| Crude ash (%) | 3.0 | 3.3 | 3.5 | 4.1 | 3.2 |
| Starch (%) | 44.6 | 38.3 | 7.1 | 5.4 | 4.3 |
| Lysine (% TN) | 7.3 | 6.5 | 4.9 | 4.8 | 5.0 |
| Methionine (% TN) | 1.0 | 0.7 | 0.8 | 0.7 | 0.9 |
| Calcium (g/kg) | 1.1 | 1.4 | 2.7 | 3.0 | 2.6 |
| Phosphorus (g/kg) | 4.0 | 4.6 | 3.8 | 4.6 | 3.4 |
| Gross energy (kcal/kg) | 3770 | 3870 | 4460 | 4245 | 4380 |

TN = total nitrogen
(Source: Table de composition et de valeur nutritive des matières premières destinées aux animaux d'élevage, INRA, 2002; Heuzé V., Thiollet H., Tran G., Lessire M., Lebas F., 2018. Yellow lupin (*Lupinus luteus*) seeds. Feedipedia, a program by INRA, CIRAD, AFZ and FAO. https://www.feedipedia.org/node/23097 Last updated on May 17, 2018, 10:41))

Nevertheless, although they have a promising nutritional potential, protein-rich seeds remain underused for different species due to low digestibilities and the presence of many antinutritional factors.

Looking at the intake of energy from the protein of different seeds by monogastric animals and by ruminants, it can be quickly seen that there is an important untapped nutritional potential, of the order of 40-50% of the energy and 20% of the protein (according to INRA, 2002).

These protein-rich seeds have many antinutritional factors that may limit their uses. Their presence results in limits of incorporation in food and technical poor performance that can be summarized through a real difficulty of competitiveness of protein-rich seeds vis-à-vis other sources of protein, especially in monogastric species.

The main antinutritional factors reported are as follows:
Tannins:
Tannins are thermolabile phenolic compounds, located in the seed skins and known to reduce the digestibility of proteins by monogastric animals because they bind to proteins before digestion, forming insoluble complexes.

The tannin content is related to the color of the seed or even the flowers (Myer et al., 2001). The incorporation of tannin-rich beans leads to lower in vitro digestibility (Bond, 1976) and lower in vivo digestibility in poultry, while tannin-free varieties have higher protein and amino acid digestibilities (Gatel, 1994; Crépon et al., 2010). Tannins reduce the retention of the nitrogen fraction of the ration in monogastric birds, resulting in reduced growth rate and feed efficiency (Carré and Brillouet 1986; Garrido et al. 1988), as well as reduced egg weight (Martin-Tanguy et al. 1977).

There are tannin-free varieties of fava beans. However, their agronomic performance is poor and today makes their introduction into production obsolete.

The tannin content of fava bean seeds is highly variable, with an average value equal to 0.49 g/100 g dry matter to a maximum of 1.70.

In the case of pea seeds, tannins are either absent or present at an average level of 3.9 g/100 g dry matter.

Vicine and Convicine:

The cotyledons, or kernels, of fava bean seeds contain vicine and convicine. They are thermostable glycosides (Muduuli et al. 1982) which are responsible for favism in human populations suffering from glucose-6-phosphate dehydrogenase deficiency.

Vicine and convicine have not been shown to affect bean digestibility in pigs, but they have been reported to be responsible for a decrease in egg weight in laying hens (Lesser et al., 2005 and Gatta et al., 2013) and egg-laying intensity (Muduuli et al. 1981). Early on, studies established that vicine and convicine reduced egg production in laying hens (Guillaume et al., 1977, Fru-Nji et al., 2007, Olaboro et al., 1981).

There are varieties free of vicine and convicine. They have the advantage, unlike those without tannins, of obtaining quite satisfactory agronomic performances (Duc et al., 1999).

The levels found in fava bean seeds vary from 0.02 to 1.49 g/100 g (Khamassi et al., 2013).

Antityptic Factors:

Trypsin and chymotrypsin inhibitors are inhibitors of proteases (and amylases) that bind to trypsin in the small intestine, preventing protein digestion. Their ingestion is accompanied in rats, pigs and, to a lesser extent, chickens by an increased loss of endogenous protein in the form of an inhibitor-enzyme complex, rich in sulfur amino acids, which is excreted (Liener 1979). This phenomenon accentuates the deficiency of legume seeds in these amino acids and the animal's growth is then slowed. The lower enzyme concentration in the small intestine leads to both hyperactivity and hypertrophy of the pancreas. These molecules, which are proteinic in nature, are relatively thermolabile.

For peas, trypsin inhibitors are the main antinutritional factor, with just under 2% of the protein content (raw soybeans contain 8 times this amount). There are large varietal differences in antityptic factors. The trypsin inhibitory activity of 33 European spring pea varieties ranged from 1.69 to 7.56 trypsin inhibitory units (TIU), while that of winter peas was 7.34-11.24 TIU (Leterme et al., 1998). For fava beans, the trypsin inhibitor content is lower, with a mean value of 2.9 TIU (0.88-6.25).

Lectins:

This group of compounds, widespread in the plant kingdom, is very polymorphic. They are heat-sensitive glycoproteins, whose common characteristic is their affinity for sugars, which explains their blood red cell agglutination properties in vitro (lectins combine with glycosyl residues present on the walls of red blood cells), to varying degrees depending on the lectin and the animal species considered (Liener 1986). They act in the small intestine by interfering with the absorption of the final products of digestion by binding and disruption of epithelial cells (Dixon et al., 1992). Their ingestion results in growth retardation, poorly explained to date.

They represent about 2.5% of pea protein (Perrot, 1995) and 2.0 to 13.0% of fava bean protein.

Alkaloids:

Earlier varieties of lupins were considered bitter. They contained a toxic alkaloid (lupanine) and were not recommended for animal feed without prior treatment. Thus, it is known that high levels of some lupin varieties containing these alkaloids can cause adverse effects manifested by reduced growth performance and feed consumption.

However, with advances in genetics, sweet varieties (with low alkaloid content) have been obtained and no longer pose palatability problems.

Oligosaccharides:

These are small polymers of a carbohydrate nature and thermostable. Livestock and domestic animals do not possess alpha-galactosidase, an enzyme necessary for the hydrolysis of the bond between galactose and glucose as well as between two galactose molecules. These molecules do not cross the intestinal wall and are therefore intact in the colon where they are metabolized by the microorganisms present, causing a degradation of growth performance due to a decrease in ingestion. The resulting fermentation results in digestive discomfort (flatulence, diarrhea) likely to slow food intake (Diaz et al., 2006, Kaysi and Melcion, 1992). This degradation of growth is accentuated when the incorporation of lupin increases. The results of experiments in pigs showed that oligosaccharides negatively affected the apparent digestion of proteins, fats and some minerals. In addition, large amounts of oligosaccharides increased the empty weight of the small intestine. Because organ tissues such as the intestinal tract are metabolically very active, more energy is required to maintain the animal's basic metabolism, leaving less energy for growth.

White lupin seeds contain 7-14% α-galactosides, the most preponderant of which is stachyose (2.8%), followed by sucrose (1.8%), raffinose (0.4%) and verbascose (0.3%) (Zdunczyk et al. 1996, Saini, 1989). The level of oligosaccharide can depend on the variety but also on the growing and harvesting conditions (Pisarikova et al., 2009). There is a relationship between stachyose and verbascose content and flatulence phenomena, with raffinose appearing to have less effect. It is also present in fava bean and pea seeds, although to a lesser degree, as shown in the table below.

| g/100 g DM | Stachyose | Raffinose | Verbascose |
|---|---|---|---|
| Lupin | 2.8-5.3 | 0.4-1.1 | 1.4-2.0 |
| Pea | 2.3-2.6 | 0.5-0.6 | 2.2-3.4 |
| Fava bean | 0.8-1.6 | 0.1-0.4 | 2.5-3.4 |

Opazo et al., 2012; Ezierny et al., 2010.

Phytic Acid:

Phytic acid is the main form of phosphorus storage in many plant tissues. Phosphorus in this form is not available to non-ruminants due to the lack of the enzyme phytase which separates phosphorus from phytate molecules.

Phytic acid is an important chelating agent for minerals such as calcium, magnesium, iron and zinc, and can therefore contribute to mineral deficiencies. To a lesser extent, it also binds to protein and starch, which results in a decrease in the availability of these nutrients in the digestive tract.

The concentration of phytic acid in fava beans is of the order of 0.2 to 0.7% dry weight.

The use of phytases incorporated in monogastric feed is now widespread and represents the main way of controlling this antinutritional factor.

Fiber:

Monogastric animals in general have limited digestive capacity for fiber. Protein-rich seeds are relatively well endowed with it: 5.2%, 7.9% and 11.4% crude fiber in pea, fava bean and white lupin seeds, respectively. This fiber therefore also represents a category of antinutritional factors that should be highlighted, particularly in young monogastric livestock such as chickens, piglets and fish, but also for young pets such as dogs and cats.

Not only is the digestibility of this fiber low, but it also provides less digestibility of protein and other nutrients, as it acts as a "bulwark" for the animals' digestive enzymes by limiting their accessibility; and as a bulb in the gut limiting the uptake of nutrients.

In summary, it appears from the above that a sum of antinutritional factors present in protein-rich seeds is to be taken into account in order to move toward a more limited use of these seeds in monogastric rations and toward an improvement in their nutritional and metabolic value.

Technical Problem to be Solved

The limits to the use of protein-rich seeds in animal nutrition are manifold and linked to technical and economic barriers.

From a technical point of view, the challenge is to reduce the effect of antinutritional factors and to improve the energy and protein digestibility values of the seeds.

And from an economic point of view, no technical implementation today has succeeded in meeting the challenge of being economically viable, considering only the extremely underdeveloped uses of protein-rich seeds in monogastrics, in both conventional and organic systems.

There are two main approaches for the nutritional improvement of protein-rich seeds: plant breeding and seed treatment technologies.

For example, in terms of varietal selection, several antinutritional factors have already been targeted by this approach, some successfully, i.e. with the deployment of these varieties among farmers: this is the case in particular for tannins in peas, vicines and convicines in fava beans, and alkaloids in lupins.

However, for many of the antinutritional factors in these plant species, the genetic approach has not proved its worth in the field. Moreover, varieties poor in certain antinutritional factors are low-yielding varieties.

In parallel with the varietal selection work on antinutritional factors, many technological processes have been tested to reduce or eliminate antinutritional factors, and/or improve the nutritional and digestibility values of seeds.

The different processes tested so far relate to mechanical, or thermal, or thermomechanical, or enzymatic approaches.

It should be noted that the bibliography on the technological processes for processing protein-rich seeds is very heterogeneous, partial, not very informative and most often old.

Many of the published works have sought to compare one technology to an untreated control, or technologies to each other in a pairwise comparison. Or using often different in vitro evaluation techniques, and/or in vivo studies under varying conditions.

Indeed, the partial results from the bibliography are old and have not kept pace with changes in technology over the last 30 years; and they only present comparisons between technologies, without really considering the optimization of these technologies or, better still, combinations of technologies.

For this reason, the current bibliography does not in any way allow clear conclusions to be drawn on the technologies and corresponding parameters to be used, particularly for industrial implementation.

On the other hand, in vivo studies, which are generally rather old, have largely been carried out on animals with less productive genetics and foods less adapted to current food systems.

In fact, animal genetic selection, whose feed consumption index is increasing by an average of 2.5% per year, is carried out for global production, with maize- and soy-based feeds, classically used (Schmidt et al., 2009; Zuidhof et al., 2014).

This does not allow optimal added value for raw materials that are more diversified in terms of energy and protein sources, such as protein-rich seeds.

Therefore, the effects of antinutritional factors (ANF), plant varieties and technologies can probably be magnified from current in vivo animal models of assessment. Because in this context, it is becoming increasingly difficult to make current protein-rich seeds perform well.

It is in this sense that, although many technological treatments have been tested in the past, some of them deserve to be re-examined in the current technical and economic contexts.

The main treatments so far tested on these protein-rich seeds are the following:

Mechanical Treatments:

The "classic" mechanical treatments, grinding, micronization, destroy the initial structure of the seeds by breaking the cell walls and starch granules. These treatments allow the division into smaller particles by coarse grinding (5 mm particles) or fine grinding (2-3 mm screen), i.e. by crushing, bursting (hammer mill) or shearing (knife mill or cylinder).

The size of the particles obtained and their damage determine the degree of exposure of biochemical constituents to digestive agents (rumen microbes or intestinal enzymes) and thus the speed of their digestion. The tissue structure is largely preserved. However, grinding with a screen of 3 mm or even 1 mm followed by agglomeration destroys the tissue structure.

While digestibility can be, especially in the case of micronization, improved by allowing an increase in the digestibility of starch (in pigs and poultry) and protein (only in pigs, no effect on poultry), there is no impact on antinutritional factors.

Hulling/decoating of the seed removes the husks or skins from seeds that contain exclusively cellulose, fiber, certain antinutritional factors and contaminants.

Hulling is a mechanical separation of the grain from the hull, most often used on pea, fava bean and soybean seeds. The objective is to reduce the cellulose content in order to enrich the raw material, and to improve the recovery of the seeds by eliminating certain ANF present in the shell such as tannins.

Hulling consists of removing the film (thin membrane) present around the grain and has the same advantages as decoating.

These two processes concentrate certain nutrients such as protein and fat and separate only a portion of the ANF contained in these films.

Heat Treatments:

Heat treatments include granulation, toasting, flaking and autoclaving: the action of heat is combined with that of external hydration in the form of water or steam at reduced pressure (long wet cooking at moderate temperature). A superior effect of toasting and autoclaving can be distinguished compared with flaking and granulation.

These processes have more or less important positive effects on the energy value in particular but are not widespread in animal nutrition for lack of profitability.

As far as roasting and "jet-sploding", dry and short cooking at very high temperatures with heat transmitted by conduction, convection and radiation, is concerned, no proof of effectiveness has been demonstrated so far. Indeed, this process scarcely modifies the granulometry and thus the integrity of the seed tissues.

Thermomechanical Treatments:

Extrusion cooking is a complex operation that is equivalent to several unit operations: mixing, cooking and shaping. Each of these operations can be modulated, according to the material to be treated and the product to be obtained, by the appropriate choice of the machine control parameters.

Driven by screws, the material is subjected for a very short time (20 to 60 s) to high temperatures (100 to 200° C.), high pressures (50 to 150 bar), and more or less intense shearing. Under the action of these physical parameters, the material undergoes physicochemical modifications and homogenization. Its exit through the die gives it its final shape. The sudden drop in pressure during extrusion triggers an instantaneous vaporization of the water present, which can lead to a characteristic expansion of the product.

The first extruder-cookers were single-screw. The second generation of equipment are twin-screw devices (with two parallel, tangential or co-penetrating screws, rotating in the same or opposite directions); they are more flexible in use and allow in particular to work with greater regularity.

This cooking-extrusion process allows the destruction of part of the ANF and improves the digestibility of the seeds but the results remain variable and not always reproducible, if the many parameters involved are not controlled (type of machine (single-screw/twin-screw), mechanical constraints (type of screw, lock, speed, die . . . ), thermal constraints (water, steam, duration . . . ), presentation constraints (die for flours, croquettes . . . )).

However, thermomechanical processes are not well known for most protein crops and have yet to be developed.

Enzyme Treatments:

All animals secrete enzymes to digest food. However, the animal's digestive process is not 100% efficient. For example, pigs and poultry do not digest 15 to 25% of the food they eat. The intake of exogenous enzymes in animal feed, especially monogastric enzymes, improves the digestibility of starches, proteins, fibers and minerals. This enzymatic contribution allows for better growth performance and a reduction in waste into the environment.

Enzyme supplementation is carried out using an isolated commercial enzyme, selected on a few enzyme activities. Trials have shown the interest of this technique as a way of improving the nutritional value of protein crops, but it has not proved to be economically viable.

Technological Treatments and Starch Gelatinization, Protein Denaturation and Fat Availability:

Temperature, pressure and humidity affect the components of food. In many processes, temperature is one of the factors that further disrupts the structure of the starch (Pan et al., 2017; Wang et al., 2016a; Zhang et al., 2014). However, when the heating temperature is fixed, water content or pressure plays an equally important role in disrupting structures and increasing starch digestibility (Wang et al. 2017b). However, it is important to consider all these parameters as the same effects such as protein denaturation, starch gelatinization and starch interactions can be achieved by different combinations of these parameters. For example, at the extreme, gelatinization can be achieved at room temperature by treatment under hydrostatic pressure. At constant temperature and treatment time, the degree of gelatinization increases with pressure. The higher the temperature, the lower the pressure for complete gelatinization. At constant temperature and pressure, the degree of gelatinization increases with the duration of treatment.

A good example is the gelatinization of starch which corresponds to the passage of the matrix from the solid or granular state to the glassy state and then to the liquid state (Cuq et al., 2003). The transition to the different states depends on technological parameters such as pressure, temperature, time and water content. The solid-glass transition temperature may be different depending on humidity and pressure conditions. At this level, the matrix changes from a solid state to a mobile rubbery state (Keetels, 1995; Behnke, 2001). Likewise, the melting temperature from the glassy to the liquid state also depends on the humidity and pressure conditions. At this temperature the matrix becomes liquid (Keetels, 1995). The extent of the transformation depends mainly on the duration and speed of heating (Mariotti et al., 2005; Wang & Copeland, 2013). The length of time these technological parameters are maintained leads to a total transformation of the matrix. It should be noted that gelatinization takes place in those parts of the matrix where the water content is sufficiently high (Hoseney, 1994).

The technological parameters applied during processing will induce physicochemical changes such as starch gelatinization or protein denaturation. Finally, nutrients can interact with each other involving complex modifications such as Maillard reactions (Svihus, 2006) or polymerize with each other to form a new structure (Svihus et al., 2005).

Starch gelatinization and protein denaturation modify the structures and thus the properties of the matrices. The viscosity is therefore different between a native matrix and a treated matrix. These modifications positively influence the digestibility of nutrients by the animal (Champ and Colonna, 1993). Research on the gelatinization of starch under pressure has shown improved enzymatic digestibility of treated starch (Hayashi and Hayashida, 1989).

The fat availability (FA) when lipid-based seeds are used is an essential parameter to be controlled to increase its value to the animal, and all the more so as they are rich in it. Technological seed treatment processes, using mechanical and thermal forces, promote the rupture of cell walls and plasma membranes leading to a higher release of fat contained in the lipid vacuoles. Thus, the use of adapted technological treatments allows to maximize this fat release. The interest of the latter for the animal is related to the improvement of lipid digestibility (Noblet et al., 2008), and to the efficiency of dietary fatty acid deposition in pigs (Chesneau et al., 2009), as well as to the in vitro biohydrogenation of fatty acids in dairy cows (Enjalbert et al., 2008).

Treatments Applied by the Economic Actors of the Livestock Sector:

The observation in today's breeding sectors is based on the fact that:

1—the varieties produced do not have their own characteristics in terms of nutritional composition, other than agronomic characteristics;

2—the technological processes for using seeds in breeding are basic since they only use mechanical grinding treatments, or even decoating in the case of salmonids, heat treatments for granulation and toasting, and the rare thermomechanical cooking and extrusion treatments.

In fact, the only uses currently present are basic and therefore extremely underdeveloped, explained by a lack of technical and economic viability.

In summary, some of the technical limits to the use of protein crops in food can be lifted through genetics, for example certain antinutritional factors such as antitryptic factors, tannins, vicine and convicine in particular.

Others can be done by processing methods such as decoating to remove the tannins contained in the film, or thermal processes that under certain conditions can overcome certain heat-sensitive antinutritional factors.

Finally, mechanical processes such as grinding help to improve the nutritional value of the seeds, as do thermal processes such as toasting and granulation, or thermomechanical processes such as cooking extrusion, or enzymatic processes such as the addition of enzymes.

Separately, therefore, each of these genetic selection pathways or technological processes reported in the bibliography propose well-known areas for improvement in the limitation or elimination of antinutritional factors on the one hand and/or the improvement of seed digestibility/degradability values on the other, but not one of them is sufficient to be technically complete and economically advantageous, in terms of adding technical and economic value, as shown by the non-existence of generalized practices in the field.

In a historical market where the choice of plant protein sources in animal diets is based on essentially economic criteria, the place of protein-rich seeds in relation to existing limits has been reduced to nothing, to the benefit above all of soya meal, and secondarily of rapeseed and sunflower oil cake, and even synthetic amino acids.

In a new market where the trend is not only to produce meat or eggs at a competitive price, but also to meet the expectations of consumers inclined to more product traceability and proximity, the challenge is certainly to have competitive protein sources but also locally produced and traced protein sources.

Lupin, fava bean and pea crops thus have many agronomic and environmental benefits, providing well-known ecosystem services and recognition of interests by producers and consumers.

To succeed in reintroducing protein crops into the soil and troughs in a sustainable manner, there are favorable contextual elements: "political" incentives (protein crop aid plan, "Ecophyto" plan, innovation aid . . . ), agronomic assets (yield of the following cereals, less use of inputs . . . ), potential responses to many agricultural (protein autonomy, economic sustainability . . . ) and societal (local, non-GMO, soybean-free, biodiversity, environment . . . ) expectations.

However, this enabling environment is not sufficient to increase the use of metropolitan oilseed and protein crops if our plant and animal production systems are not technically robust and economically viable. It must therefore be accompanied by the development of new, technically and economically efficient technologies to provide the best solutions for the agricultural and livestock sectors.

Proof of this is to be found in the only technological treatments currently applied by the economic players in the livestock sector. In today's livestock sectors, the observation is based on the non-optimal use of technological treatments. As previously stated, the technological processes for using seeds in farming use only mechanical grinding treatments, or even decoating for salmonids, only thermal treatments for granulation and toasting, and the rare thermomechanical treatments of cooking and extrusion.

In fact, the only uses currently present in monogastric feeding are basic and therefore extremely underdeveloped, explained by a lack of technical and economic viability. Moreover, they are not made complementary to the genetic approach.

There is therefore currently an unresolved need to provide a process for treating protein crops that avoids many of the disadvantages detailed above, through a combination of different approaches, combined in such a way that they generate a synergistic effect.

In addition, beyond the evaluation of these processes in terms of their use by animals, it is interesting to use methods for evaluating the quality of a technological treatment with regard to their potential for animals.

It is in this sense that several methods for qualifying processes relating to the main nutritional components of starch, protein and fat have been selected and are presented below:

Method for Evaluating the Rate of Starch Gelatinization or Starch Damage

Starches change their structure from a natural structure to a gelatinized structure and then to a new structure during the transformations depending on temperature, pressure, humidity and the duration of the treatment. Although the gelatinized structure is attacked by amylase, both the new structure and the natural structure are resistant to the action of amylase.

The rate of starch gelatinization of protein-rich seeds was determined according to the methodology described by Chiang and Johnson (1977). This method is based on increased enzymatic susceptibility, i.e., gelatinized starch grains are more easily hydrolyzed than native starch grains. Briefly, the total starch is hydrolyzed with amyloglucosidase, under specific conditions, so that only gelatinized starch is hydrolyzed. To determine its proportion, the total starch is determined according to the standard enzymatic method (AFNOR 2005) to serve as a base value.

Method for Evaluating Protein Solubilization

The technological treatments applied to protein-rich seeds are likely under certain conditions to denature proteins. This denaturation is manifested by the establishment of new links between polypeptide chains (cross-linking), leading to their aggregation and insolubility. The bonds formed, usually involving lysine and glutamic acid residues, are resistant to enzymatic hydrolysis. This insolubility, or lesser solubilization of the protein is of interest in the field of animal nutrition. For example, it reduces allergenicity by destroying certain epitopes (Toullec et al. 1992) and limits ruminant protein degradation (Benchaar et al. 1992).

The determination of protein solubility is evaluated by solubilizing the proteins in buffers at different pH: acid, native, basic. After determination of the protein content (Kjeldahl method) of the raw material and of the proteins in solution in the different buffers, a material balance is established in order to determine the solubilized fraction.

Method for Fat Availability

This internal method is based on the evaluation of the proportion of fat extracted in a solvent after a predetermined time. The purpose of this assay is to mimic the gradual and stepwise release of fat into the different compartments of the animals' digestive tract.

Briefly, the assay is carried out in four steps:
Preparation of the raw material: it consists of a coarse grinding in order to obtain a heterogeneous granulometry as in the case of the grindings carried out in the animal feed industry;
Extraction of the fat: It consists in bringing the preweighed raw material into contact with an extraction solvent (e.g. petroleum ether) under controlled stirring for a predetermined period of time, in this case 10 minutes. It is also possible to carry out this extraction phase for different durations, thus making it possible to deliver a release kinetics of the fat.
Solid/liquid separation by filtration: This consists of filtering the grind dissolved in the solvent in order to recover only the liquid phase in a dry and previously tared flask.
Removal of the solvent from the extract and weighing of the dry residue: It consists of an evaporation of the solvent having solubilized the fat. Once evaporated, dried and cooled, the flask will be weighed. This cycle is repeated until a constant mass is obtained.

Thus, it is possible to characterize the seeds through the FA, the values of which are dependent on the operating conditions set.

This released fat, known as available because it is quickly accessible, will be absorbed through the intestinal wall. Thus absorbed, it can be used by the animal for its own metabolism.

In a complementary and ingenious way, we have also chosen direct and indirect methods of protein and carbohydrate complexing.

Method for Evaluating Protein Degradability (ED1)

The enzymatic degradability of the protein (ED1) in protein-rich seeds was measured according to Aufrère et al. (1989, 1991). Briefly, the sample was hydrolyzed by protease in borate-phosphate buffer at pH 8 at 40° C. for 1 hour. The determination of degraded nitrogen is carried out on the supernatant and related to the total amount of nitrogen in the sample.

Method for Evaluating N-ε-Carboxymethyllysine (CML) and Total Lysine

CML and lysine levels were determined using the method of Niquet-Léridon and Tessier (2011). In summary, each sample is reduced and then hydrolyzed in acidic medium before being analyzed by high-performance liquid chromatography (HPLC) coupled with tandem mass spectrometry (MS/MS) detection. Any matrix effects are corrected by the addition of an internal standard, a stable isotope of CML (CML-$D^2$) and lysine (lysine-$^{15}N_2$).

In addition, heating proteins in the presence of reducing sugars (fructose, lactose, etc.) leads to the formation of many complex polymers, including lysine. This reaction, called non-enzymatic browning or Maillard reaction, also contributes to reducing the digestibility of proteins.

Method for Evaluating Acrylamide

Acrylamide is the common name for 2-propenamide (acrylic amide) of the empirical formula $C_3H_5NO$. Acrylamide can be formed in particular during the cooking at high temperature of raw materials rich in carbohydrates (starch, sugars) and protein that react with asparagine (Maillard reaction). The formation of acrylamide appears to be strongly influenced by the cooking temperature, the water content of the food, and the "browning" or "carbonization" of the products. Acrylamide is formed during cooking at temperatures of 120° C. or higher.

Briefly, the acrylamide in the sample is extracted in water by stirring and then, after centrifugation and recovery of the supernatant, is purified on an SPE cartridge and then quantified by UPLC-MS/MS in MRM mode.

Recent art in the field of the invention consists of the following documents:

JEZIERNY D ET AL: "The use of grain legumes as a protein source in pig nutrition: A review", ANIMAL FEED SCIENCE AND TECHNOLOGY, vol. 157, no. 3-4, 11 May 2010, pages 111-128, XP027006418, ISSN: 0377-8401 (D1);

PATRICIO SAEZ ET AL: "Effects of decoating, steam-cooking and microwave-irradiation on digestive value of white lupin (Lupinus albus) seed meal for rainbow trout (Oncorhynchus mykiss) and Atlantic salmon (Salmo salar)", ARCHIVES OF ANIMAL NUTRITION, vol. 69, no. 2, 4 Mar. 2015 (D2);

FR 3 040 588 A1 (D3);

FRANCESCO MASOERO ET AL: "Effect of extrusion, expansion and toasting on the nutritional value of peas, fava beans and lupins", ITALIAN JOURNAL OF ANIMAL SCIENCE, vol. 4, no. 2, 1 Jan. 2005 (D4). D1 is like a "catalogue" of independent treatments for protein-rich seeds. The paper discusses the possibility of reducing the level of antinutritional factors by a selection technique or by techniques known per se such as physical treatments, D2 is only interested in the treatment of a single seed (Lupinus albus) by decoating, steaming and microwave treatment.

D3 refers to a seed treatment process including a seed germination step.

D4 relates to the effects of extrusion, expansion and roasting on the nutritional value of certain protein-rich seeds.

SUMMARY OF THE INVENTION

Thus, the present invention relates to a process for treating protein-rich seeds to enhance their value as foodstuffs, in particular for animals, these seeds being selected from at least one of the following seeds: fava bean (Vicia fava L.), pea (Pisum sativum L.), white lupin (Lupinus albus L.), blue lupin (Lupinus angustifolius L.) and yellow lupin (Lupinus luteus L.), characterized in that it comprises the following successive steps:

a) use of seeds of at least one of the abovementioned plant species, provided that they have a protein content, and/or a starch content, and/or a fat content, of a value greater than or equal to that indicated in the table below:

| Nutritional Compounds | Content higher than | | |
|---|---|---|---|
| | Protein (g/100 g DM) | Starch (g/100 g DM) | Fat (g/100 g DM) |
| Fava bean Vicia fava L. | 28 | 39 | |
| Pea Pisum sativum L. | 22 | 45 | |
| White lupin Lupinus albus L. | 35 | | 8 |
| Blue lupin Lupinus angustifolius L. | 31 | | 5.5 |
| Yellow lupin Lupinus luteus L. | 38 | | 5.0 |

And, at least one of the compounds from the following group: antinutritional factor (ANF), crude cellulose, neutral detergent fiber (NDF), at a level lower than that indicated in the table below:

| Species | ANF/Crude cellulose/NDF | Content less than (g/100 g DM) |
|---|---|---|
| Fava bean Vicia fava L. | Tannins | 0.3 |
| | Vicine, convicine | 0.5 |
| | Alpha-galactosides | 2.5 |
| | Crude cellulose | 10 |
| | NDF | 18 |
| Pea Pisum sativum L. | Tannins | 0.01 |
| | Alpha-galactosides | 5 |
| | Crude cellulose | 7.5 |
| | NDF | 18 |
| White lupin Lupinus albus L. | Alkaloids | 0.1 |
| | Alpha-galactosides | 10 |
| | Crude cellulose | 16 |
| | NDF | 25 |
| Blue lupin Lupinus angustifolius L. | Alkaloids | 0.2 |
| | Alpha-galactosides | 9 |
| | Crude cellulose | 18 |
| | NDF | 29 |
| Yellow lupin Lupinus luteus L. | Alkaloids | 0.3 |
| | Alpha-galactosides | 12 |
| | Crude cellulose | 18 |
| | NDF | 29 | b) Pressurizing the seeds from step a) for more than 10 seconds at a PG-4T minimum pressure of 10 bars until a temperature of more than 80° C. is reached;

and/or b1) heating of the seeds, for a minimum period of 15 minutes, preferentially 30 minutes to 2 hours, at a temperature above 80° C., preferentially of 90 and 150° C.

According to other non-limiting and advantageous characteristics of the invention:

after the implementation of said step a), they undergo fractionation;

after said step a) has been carried out and where seeds of different species and/or different composition of protein, starch, fat, antinutritional factor, crude cellulose, or neutral detergent fiber (NDF) are involved, they are mixed and fractionated, or fractionated and then mixed;

prior to step b), a thermal step of preparation of the seeds is carried out with steam and/or a water-based liquid, until a temperature of between 30 and 90° C. and a humidity of more than 12%, preferentially 15%, is obtained, for a period of more than 2 minutes, preferentially 15 minutes;

the thermal step of preparation is carried out in the presence of at least one exogenous enzyme identified among the following families: arabinofuranosidases, beta-glucanases, cellulases, glucoamylases, pectinases, pectin methyl esterases, phytases, proteases, xylanases and, preferentially, xylanases, beta-glucanases and pectinases, said exogenous enzyme having been previously added to the seeds or to the mixture;

at the thermal stage of preparation in the presence of exogenous enzyme, the humidity is set at more than 15%, preferentially 25%, and the preparation is made to last for at least 15 minutes, preferentially 60 minutes;

when carrying out said thermal preparation step, the mixture is stirred;

when mixing and then fractionating, a new mixing is carried out after the fractionation;

said fractionation is continued until at least 90% of said seeds have a particle size of less than 2000 micrometers, preferentially less than 1500 micrometers;

said step b1) is carried out on said mixture;

step b) or b1) will be discontinued if the level of at least one of the antinutritional factors listed in the table below is lower than the level also indicated below:

| Species | Nature of the antinutritional factors | Content less than |
|---|---|---|
| Fava bean Vicia fava L. | Lectins (g/100 g raw material) | 0.10 |
| | Antitryptic factors (TIU/mg raw material) | 1.50 |
| Pea Pisum sativum L. | Lectins (g/100 g raw material) | 0.10 |
| | Antitryptic factors (TIU/mg raw material) | 1.50 | following step a), the seeds are hulled and/or decoated;

after said step a) or after said hulling and/or decoating step, a specific fractionation and separation of said seeds is carried out according to a criterion selected from size, weight, shape, density, an aerodynamic, colorimetric or electrostatic parameter;

following step a), or upstream, said seeds are sorted according to a criterion chosen from among size, weight, shape, density, an aerodynamic, colorimetric or electrostatic parameter;

mixed with said seeds is at least one other raw material selected from the group consisting of oilseeds and their co-products, oils, protein-rich seed co-products, cereals and their co-products, simple and complex carbohydrate sources, and oilseed cake;

said raw material is a lipid source, preferentially an oil seed;

it has an ultimate stage during which said seeds are cooled.

BRIEF DESCRIPTION OF THE FIGURE

FIG. 1 depicts the characteristics and results of the dog allergenicity test, wherein the allergenicity (or reactivity) was assessed by immunoblot using sera from food-sensitized dogs.

DETAILED DESCRIPTION OF THE INVENTION

In support of the present invention, digestibility tests on target monogastric species were carried out, among which chicken, rooster, pig and fish were selected.

The assessment was based on:

the use of energy, which is based on different approaches depending on the species: Metabolizable energy in poultry (ME), digestive utilization coefficient (DUC) of energy in pigs, apparent digestive utilization coefficient (DUCa) of energy in fish;

the use of protein, which is based on the determination of the digestive utilization coefficient of the protein.

Zootechnical production performance tests on the same species, namely chicken, laying hens, pigs and fish, were also carried out.

In this case, the aim is either to show superior growth and/or laying performance, or to check whether the growth and/or laying performance is identical to that of the control, provided that the nutritional values of the solution resulting from the invention are those derived from the values previously determined by the digestibility tests.

The process of the present invention consists of a combination of the following steps:

Step a): Use of Specific Seeds

Use of at least one protein-rich seed made special by the fact that it has a high content of at least one (1) nutritional component, preferentially two (2), three (3) or even four (4), from among protein, starch or fat, and a low content of at least one thermostable antinutritional factor or a nutritional component of low value such as crude cellulose or neutral detergent fiber (NDF).

Seeds with a high protein, starch and fat content are considered to be high protein, starch and fat seeds if their content is equal to or greater than the thresholds below (right-hand column):

| Species | Nutritional Compounds | Range of variation (g/100 g DM) | | High-content seed (g/kg DM) |
|---|---|---|---|---|
| | | Minimum | Maximum | |
| Fava bean Vicia fava L. | TN | 25% | 33% | >28% |
| | STARCH | 32% | 49% | >39% |
| Pea Pisum sativum L. | TN | 19% | 27% | >22% |
| | STARCH | 41% | 58% | >45% |
| White lupin Lupinus albus L. | TN | 32% | 40% | >35% |
| | MG | 8% | 12% | >8% |
| Blue lupin Lupinus angustifolius L. | TN | 26% | 44% | >31% |
| | MG | 4% | 8% | >5.5% |
| Yellow lupin Lupinus luteus L. | TN | 34% | 46% | >38% |
| | MG | 3% | 7% | >5% |

It is indeed advantageous to use the seeds richest in protein and/or energy (in starch in particular for the fava bean seed, Vicia fava L.; or pea seed, Pisum sativum L.; and in lipids for white lupin seed, Lupinus albus L.; or blue lupin seed, Lupinus angustifolius L.; or yellow lupin seed, Lupinus luteus L. to make the process more competitive from a technical and economic point of view; this is not only because of the concentration of nutrients of interest, but also because of the positive interaction on the biochemical reactions during the technological process (synergistic effect).

Seeds with a low content of heat-stable ANF or a low value nutritional component are considered as seeds with a low content of heat-stable ANF or a low value nutritional component if their content is below the thresholds below (right-hand column):

| Species | Thermostable antinutritional factors | Range of variation (g/100 g DM) | | Low-content seeds (g/100 g DM) |
|---|---|---|---|---|
| | | Minimum | Maximum | |
| Fava bean Vicia fava L. | Tannins | 0.01 | 1.25 | <0.30 |
| | Vicine, convicine | 0.03 | 2.00 | <0.50 |
| | Alpha-galactosides | 1.00 | 6.20 | <2.50 |
| | Crude cellulose | 7.00 | 12.00 | <10 |
| | NDF | 12.40 | 22.10 | <18 |
| Pea Pisum sativum L. | Tannins | 0.00 | 0.74 | <0.01 |
| | Alpha-galactosides | 2.30 | 11.30 | <5 |
| | Crude cellulose | 3.70 | 8.50 | <7.5 |
| | NDF | 9.00 | 22.00 | <18 |
| White lupin Lupinus albus L. | Alkaloids | 0.01 | 3.00 | <0.1 |
| | Alpha-galactosides | 6.00 | 14.00 | <10 |
| | Crude cellulose | 13.60 | 28.10 | <16 |
| | NDF | 20.50 | 35.20 | <25 |

-continued

|  |  | Range of variation (g/100 g DM) | | Low-content seeds (g/100 g DM) |
|---|---|---|---|---|
| Species | Thermostable antinutritional factors | Minimum | Maximum | |
| Blue lupin | Alkaloids | 0.01 | 3.00 | <0.2 |
| *Lupinus* | Alpha-galactosides | 6.00 | 14.00 | <9.0 |
| *angustifolius* L. | Crude cellulose | 13.60 | 28.10 | <18 |
|  | NDF | 20.50 | 35.20 | <29 |
| Yellow lupin | Alkaloids | 0.01 | 3.00 | <0.3 |
| *Lupinus* | Alpha-galactosides | 6 | 16 | <12.0 |
| *luteus* L. | Crude cellulose | 13.6 | 28.1 | <18 |
|  | NDF | 20.50 | 35.20 | <29 |

(DM = Dry matter)

Variability in seed composition exists within the same species, due to factors such as variety, cultural itinerary, pedoclimatic conditions . . . . The selection of protein-rich seeds on their nutritional quality leads to impacts on the industrial technological processes implemented thereafter. Indeed, the presence of proteins, starch and lipids in the matrices influences the "processability" and therefore the transformation of these nutrients, notably through analyses of starch gelatinization, protein denaturation and fat availability, which are known to predict improved digestibility. The levels of transition from one state to another (solid, vitreous, liquid) are dependent on the proportion of the nutrients mentioned above.

Thus two seeds of the same species and of different compositions will, upon hydrothermal iso-treatment, react differently; namely that the particular seeds retained at the 1st stage of the invention are characterized, at the end of the same hydrothermal treatment, by an increase in the denaturation of the proteins, the gelatinization of the starch and the available fat, compared with the non-retained seeds.

From another angle, for the same objective of protein denaturation, starch gelatinization and available fat, the particular seeds selected at the first stage of the invention will require that a technological process be applied to them at a lower temperature, pressure, water content and/or time, i.e. a more efficient process as it requires less technological constraint(s).

Also, the higher the starch and/or protein content in pea and fava bean seeds and the protein and/or fat content in lupin seed, the lower the fiber concentration. Thus, this lower incorporation of fiber of low value to the animal leads to a higher level of digestibility, by promoting the digestibility of protein and other nutrients. This fiber acts as a "bulwark" for the animals' digestive enzymes by limiting their accessibility; and limits congestion in the gut that hinders the assimilation of nutrients.

Step b): Pressurized Heat Treatment Step

This step consists in putting the seeds under a minimum pressure of bars, preferentially 20 bars, even 30 bars, during a time higher than 10 seconds, preferentially from 10 seconds to 2 minutes, with an aim of reaching a temperature higher than 80° C., preferentially higher than 100° C., or even included between 100 and 150° C.; and even more advantageously between 110 and 140° C.; and without ever exceeding 160° C.; temperature advantageously allowed by self-heating due to shear forces, friction and compression and possibly, additionally, by an exogenous thermal input by conduction (heat transfer fluid, electrical resistance, electromagnetic fields, etc.) or by the addition of steam.

A non-exhaustive list of pressurized heat treatment equipment capable of performing this step is as follows: extruder, cooker-extruder, expander, press.

And/or

Step b1): Pressureless Heat Treatment Step

This step consists of a pressureless heat treatment, the duration of which is then extended, compared with step b), so that it is longer than 15 minutes, preferentially longer than 30 minutes, or even from 30 minutes to 2 hours, and the temperature is higher than 80° C., preferentially higher than 90° C., or even between 90 and 150° C. In the same way, the appropriate equipment for this pressureless heat treatment is for example: the dryer, the toaster, the thermostated screw.

The purpose of this step (these steps) b) and/or b1) is to reduce heat-sensitive antinutritional factors and deactivate endogenous and/or exogenous enzymes, while improving the digestibility of energy and/or protein and amino acids, especially in the case of heat treatment under pressure.

It finally makes it possible, if need be, to reduce the humidity of the seeds which will not have to exceed 14% humidity, preferentially 12%, to allow a good state of conservation of the mixture.

One way to characterize the effectiveness of this step (these steps) b) and/or b1) is to evaluate the reduction of at least one heat-sensitive antinutritional factor, the objectives of which are set out in the table below:

| Species | Antinutritional factors (ANF) To raw material | Range of variation of seeds with unreduced ANF content | | Seeds with reduced ANF content |
|---|---|---|---|---|
|  |  | Minimum | Maximum |  |
| Fava bean | Lectins (g/100 g) | 2.00 | 13.30 | <0.10 |
| *Vicia fava* L. | Antitryptic factors (TIU/mg) | 1.90 | 10.00 | <1.50 |
| Pea | Lectins (g/100 g) | 0.30 | 1.00 | <0.10 |
| *Pisum sativum* L. | Antitryptic factors (TIU/mg) | 1.70 | 15.00 | <1.50 |

(TIU = trypsin inhibitory units)

Another way is to evaluate according to the seeds to be considered the proportion of gelatinized starch to reach the minimum value of 50%, preferentially 65%, advantageously 80% for peas and fava beans; or the proportion of protein solubilized at basic pH to reach the maximum value of 55%, preferentially 40%, advantageously 30% for peas, fava beans and lupin; or the available fat to reach the minimum value of 40%, preferentially 50%, advantageously 60% for lupin; or the enzymatic digestibility at 1 hour to reach the maximum value of 50%, preferentially 40%, advantageously 30% for peas and fava beans, and the maximum value of 60%, preferentially 50%, advantageously 40% for lupin; or in the case of lupin, the available fat to reach the minimum value of 40%; or the contents of Maillard compounds such as Nε-carboxymethyl-lysine (CML) or acrylamide. The threshold values not to be exceeded are 0.020 g/kg dry matter, preferentially 0.018 g, advantageously 0.015 g of Nε-carboxymethyl-lysine for fava beans and peas, and 0.025 g/kg dry matter, preferentially 0.020 g, advantageously 0.018 g of Nε-carboxymethyl-lysine for lupin; and 110 g/kg dry matter, preferentially 90 g, advantageously 70 g of acrylamide for fava beans and peas, and 300 g/kg dry matter, preferentially 200 g, advantageously 150 g of acrylamide for lupin.

| Evaluation criteria | Fava bean Vicia fava L. | Pea Pisum sativum L. | Lupin Lupinus spp. |
|---|---|---|---|
| Solubilized protein at basic pH (%) | <55% | <55% | <55% |
| Gelatinized starch (%) | >50% | >50% | — |
| ED1 (%) | <50% | <50% | <60% |
| FA (%) | — | — | >40 |
| CML (g/kg DM) | <0.020 | <0.020 | <0.025 |
| Acrylamide (g/kg DM) | <110 | <110 | <300 |

Final Step: Cooling

At the end of the thermal step b), the seeds are hot. They then need to be cooled in order to bring down the seeds from the process to a temperature that allows them to be stable over time, and thus be preserved and stored in good conditions of nutrition until consumption.

For example, the temperature should not exceed 30° C. above the ambient temperature, preferentially 20° C.

The preceding steps of the process according to the invention may also be implemented, in an advantageous manner, first of all by taking into account the elements described below:

Mixing and Fractionation of Seeds

Although this step is not mandatory, the process is improved when a fractionation or even mixing step is carried out following step a) of the process.

This step consists in choosing at least one mechanical mixing technology, when there are at least two raw materials of different nature and/or quality, and/or a mechanical technology for fractionating the seeds, or the mixture, set up in such a way that they allow for the first to achieve a homogeneous mixture of the protein-rich seeds and any additional raw materials (as described below), and for the second to break the seed coat and kernels in order to make the nutrients for the digestive enzymes more accessible and thus improve the digestibility of the seeds.

One preference is to pre-mix the materials before fractionation. It is also possible to first fractionate the materials separately and then mix them, but it is also possible to perform two mixing operations, one before and one after fractionation.

The simple and/or combined mechanical stresses used to fulfil these functions can be achieved by impacts, cuts, compression, shearing or abrasion.

Seed fractionation is characterized by particle size measurement which determines the size of the particles resulting from the process. Preferentially, the maximum size of 90% of the particles resulting from this mechanical fractionation is less than 2000 μm and preferentially less than 1500 μm.

This dimension can be achieved, for example, with a horizontal hammer mill according to the parameters below:

for equipment with a capacity of 10 t/h and a 200 kW motor, rotation speed: 2800 rpm and screen size of 3 mm.

This dimension can also be achieved with other common equipment such as hammer and roller mills or crushers, pallet mills.

Finally, other technologies exist and can also fulfill this function: grinding wheel mill, disc mill, pin mill, cutting head mill, bead or ball mill, blade mill or crusher, impactor or impact mill, etc.

Preparatory Heat Treatment

It also becomes advantageous to proceed with a thermal step, following step a) of the process, or the fractionation and/or mixing step previously described.

It is also important to remember that this step can be done on decoated seeds and flax cake (another advantageous step described later).

This step consists in choosing a thermal technology parameterized in such a way that it respects the following steps and characteristics:

First Possibility: Hydrothermal Preparation Step:

This step consists of impregnating the seeds with water vapor and/or a liquid with water, in order to reach on the seeds previously fractionated, a temperature between 30 and 90° C. for a period of more than 2 minutes and a humidity of more than 12%. In a preferential way, it is advisable to impregnate seeds during a duration higher than 5 minutes, or 15 minutes even 30 minutes, and preferentially lower than 4 hours, even 8 h, without exceeding 24 h, for a humidity higher than 15%, even 18% and lower preferentially than 40%, without exceeding 60%. And in a very advantageous way it is advisable to impregnate seeds during a duration higher than 1 hour, even 2 hours, for a humidity higher than 20%, even 25%. This step has for objective in particular to facilitate the following thermal step, under and/or without pressure, by improving the capacities of thermal conduction, by causing an activation of the endogenous enzymes of seeds and by starting the following heat treatment.

The equipment capable of carrying out this step is, in a non-exhaustive way: a preparer, a pre-conditioner and conditioner, a cooker, a mixer, a toaster, a steam impregnator, a maturer.

Or

Second Possibility: Hydrothermal and Enzymatic Preparation Step:

This preparation step consists of applying the same preparation conditions as described in the first possibility. It is distinguished simply by the fact that at least one exogenous enzyme, not present in the protein-rich seeds, is brought into activity, which may be supplied in particular as a processing aid (enzyme extracts, etc.), from additives, raw or fermented raw materials, etc., and added to the process at one of the stages prior to or during the process.

The temperature characteristics are then chosen in such a way that they correspond to the activity ranges of the enzymes selected, but remain between 30 and 90° C. The time and humidity characteristics required are the same as those described in the first possibility, considering nevertheless that these exogenous enzymes require more favorable conditions than endogenous enzymes, because they are not spatially and temporally as close to their substrates. It is in this sense that the conditions for impregnation should be adapted so that the impregnation lasts at least 15 minutes, preferentially 60 minutes, and preferentially less than 4 hours, or even 8 h, but not more than 24 h, for a humidity of more than 15%, preferentially 25%, and preferentially less than 40%, but not more than 60%. The enzyme (or enzymes) to be introduced belongs (or belong) to the families of arabinofuranosidases, beta-glucanases, cellulases, glucoamylases, α-amylases, pectinases, pectin methyl esterases, phytases, proteases, xylanases, and preferentially to the families of xylanases, beta-glucanases and pectinases.

It (or they) will have been chosen beforehand because of its (or their) efficiency in hydrolyzing particular chemical bonds that the animal is not able to make at all, or not completely, or not quickly enough.

It could also have been chosen for its ability to break down carbohydrates that are not or poorly hydrolyzed in the animal, thus allowing better access to other nutrients in the seeds by the animal's digestive enzymes.

The equipment capable of carrying out this step is for example: a preparer, a pre-conditioner and conditioner, a cooker, a mixer, a toaster, a steam impregnator, a maturer, a reactor, etc.

It should be noted that the possible addition of water, necessary for the improvement of this process, can be carried out within the aforementioned equipment but also in whole or in part at the seed mixing step, and that the addition of steam, also necessary for the improvement of the process, can be carried out within the aforementioned equipment but also in whole or in part at step b) of the process, i.e. the step of heat treatment under pressure and/or without pressure.

The steps of the process according to the invention, with or without these advantageous steps mentioned above, if need be, may also be carried out taking into account the elements described below:

Sorting

This sorting step groups seeds according to criteria of size, weight, shape, density or according to aerodynamic, colorimetric or electrostatic characteristics. The tools used to carry out these operations are in particular: the sifter, the cleaner-separator, the bolter, the plansimeter, the densimetric table, the winnower, the optical sorter, the aeration systems (air column, suction, blower . . . ), magnetic.

The purpose of this operation may be to separate seeds of different species, to remove impurities, to allot seeds of identical species, etc. The seed may be separated from other species, or it may be allotted to the same species.

Hulling and/or Decorating

The purpose of this step is, on the one hand, to concentrate the contents of protein and energy in the form of starch, particularly in the case of fava bean and pea, and protein and energy in the form of lipids in the case of lupin, and, on the other hand, to reduce the proportion of fiber and antinutritional factors present in the seed coatings.

This step of hulling and/or decoating is characterized by a minimum yield assessed from the effect of protein concentration of the seeds concerned and below is the table of expected concentration levels:

| | Protein Concentration |
|---|---|
| Fava bean | +5%, preferentially +15%, or even +20%. |
| Pea | +5%, preferentially +12%, or even 15%. |
| Lupin | +5%, preferentially +15%, or even +20%. |

Removing the coating, which is very high in fiber (and very low in protein), will result in a higher protein content in the decoated seed.

Hulling and/or decoating is carried out by combining a phase of mechanical stress and a separation phase following, if need be, a possible rehydration of the kernel of the seeds, preceded by a phase of heat pre-treatment to facilitate hulling and/or decoating.

The simple and/or combined mechanical stresses used to perform these functions may be impacts, compression or abrasion. The tools used to carry out these operations are, but are not limited to: roller and hammer mills or crushers, the impact compactor or impact mill, the polisher, the paddle mill, the grinding wheel mill, the disc mill, the pin mill, the cutting head mill, the bead or ball mill, the blade mill or blade crusher.

Separation can be carried out according to criteria of size, weight, shape, density or according to aerodynamic, colorimetric or electrostatic characteristics. The tools used to carry out these operations are in particular: the sieve shaker, the cleaner-separator, the sifter, the sieve-stoner, the plansimeter, the densimetric table, the winnower, the optical sorter, the aeration systems (air column, suction, blower . . . ), magnetic.

Specific Fractionation and Separation

A specific fractionation and separation step may be added in order to obtain more concentrated protein, carbohydrate and/or fat fractions. It is to be implemented downstream or in substitution of the hulling/decoating and/or fractionation step.

This step is characterized by a minimum yield, expressed as a concentration of proteins, carbohydrates or lipids in one or more of the fractions obtained. The fractions concentrated in protein, carbohydrates or lipids should preferentially contain at least 25% more protein, carbohydrates and/or lipids than the original whole seeds, preferentially 35% or even 50%.

This separation of the fractions, facilitated if need be by a hulling/decoating step, will be carried out first by a simple and/or combined mechanical stress step implemented with equipment such as micronizers, pin, roller, hammer or impact mills for example. And then by a separation step according to size, weight, shape, density criteria or according to aerodynamic, colorimetric or electrostatic characteristics, using equipment such as screeners, cleaners, separators, sieves, densimetric tables, turboseparators, selectors, aeration or magnetic systems.

Use of Additional Raw Material

It becomes advantageous to use at least one raw material to be added to protein-rich seeds, which will be selected for its technological and/or nutritional and/or economic properties. Indeed, depending on the use that will be made of the seeds or the mixture resulting from the process, and its destination in terms of animal species and physiological step in particular, the choice of the raw material(s) will relate in particular to the nutritional characteristics and the cost price of the raw materials.

But they will also have to be chosen on the basis of their technological advantages, in particular through their mechanical properties and therefore their predispositions to make the mechanical constraints of the process more advantageous, their rheological and physicochemical properties, and therefore their capacity to mix with protein-rich seeds in humid conditions and their water adsorption or absorption capacities, in some cases their capacity to bind to proteins, their enzymatic properties and therefore their aptitude to accentuate enzymatic activities, in particular to improve the digestibility of protein-rich seeds.

Advantageously, protein-rich seeds are associated with a share of oilseeds when heat technology involves a heat treatment step under pressure.

As an example, to facilitate the passage in the extruder, the addition of fat preferentially coming from oilseeds rather than oil, because of a more diffuse and homogeneous supply of the lubricating agent, allows the protein-rich seeds to be technologically better treated and to increase the manufacturing capacities.

Finally, more generally, the choice of additional raw material is preferentially based on the potential for nutritional and economic improvement that can be achieved by this process applied to protein-rich seeds.

Thus, among the additional raw materials, preference will be given first to oilseeds, oils, cereals and their co-products, simple or complex carbohydrate sources, then to oilseed cakes, then to all other raw materials usual in animal nutrition.

Stirring During Preparatory Heat Treatment

In the previously described preparatory heat treatment step, one advantage is that the mixture is stirred so that it undergoes uniform treatment conditions. Indeed, stirring:
- homogenizes the fractionated seeds with water and other possible additional inputs, with the aim in particular of facilitating the functionality of the enzymes brought into contact with their substrates;
- homogenizes the added water and the temperature within the seeds or the mixture;
- avoids the formation of agglomerates and thus facilitates the transport conditions of the seed or mixture.

As will be seen below, the process according to the present invention makes it possible to achieve advantageous technical results with regard to the prior art.

In fact, no process widespread in the bibliography achieves the technical and economic improvements obtained by the present process, particularly with regard to recent animal production systems, which are characterized by significant genetic advances adapted to a feeding system based essentially on soybean, grain maize and cereals.

The combination of the steps described above results in at least one protein-rich seed characterized by, at the same time:

Higher Content of at Least One (1) Nutritional Compound, Preferentially Two (2):

| | Content higher than | | |
|---|---|---|---|
| Nutritional Compounds | Protein (g/100 g DM) | Starch (g/100 g DM) | Fat (g/100 g DM) |
| Fava bean *Vicia fava* L. | 28 | 39 | |
| Pea *Pisum sativum* L. | 22 | 45 | |
| White lupin *Lupinus albus* L. | 35 | | 8 |
| Blue lupin *Lupinus angustifolius* L. | 31 | | 5.5 |
| Yellow lupin *Lupinus luteus* L. | 38 | | 5.0 |

Reduced Content of at Least One Thermostable Antinutritional Factor or Nutritional Component with Low Value. Preferentially 2, Advantageously 3 or Even 4:

| Species | Thermostable antinutritional factors | Range of variation (g/100 g DM) | | Low-content seeds (g/100 g DM) |
|---|---|---|---|---|
| | | Minimum | Maximum | |
| Fava bean *Vicia fava* L. | Tannins | 0.01 | 1.25 | <0.30 |
| | Vicine, convicine | 0.03 | 2.00 | <0.50 |
| | Alpha-galactosides | 1.00 | 6.20 | <2.50 |
| | Crude cellulose | 7.00 | 12.00 | <9.00 |
| | NDF | 12.40 | 22.10 | <16.00 |
| Pea *Pisum sativum* L. | Tannins | 0.00 | 0.74 | <0.01 |
| | Alpha-galactosides | 2.30 | 11.30 | <5.00 |
| | Crude cellulose | 3.70 | 8.50 | <5.50 |
| | NDF | 9.00 | 22.00 | <14.00 |
| White lupin *Lupinus albus* L. | Alkaloids | 0.01 | 3.00 | <0.1 |
| | Alpha-galactosides | 6.00 | 14.00 | <10 |
| | Crude cellulose | 13.60 | 28.10 | <16 |
| | NDF | 20.50 | 35.20 | <25 |
| Blue lupin *Lupinus angustifolius* L. | Alkaloids | 0.01 | 3.00 | <0.2 |
| | Alpha-galactosides | 6.00 | 14.00 | <9.0 |
| | Crude cellulose | 13.60 | 28.10 | <18 |
| | NDF | 20.50 | 35.20 | <29 |
| Yellow lupin *Lupinus luteus* L. | Alkaloids | 0.01 | 3.00 | <0.3 |
| | Alpha-galactosides | 6 | 16 | <12.0 |
| | Crude cellulose | 13.6 | 28.1 | <18 |
| | NDF | 20.50 | 35.20 | <29 |

Reduced Content of at Least One Heat-Sensitive Antinutritional Factor:

| Species | Antinutritional factors (ANF) To raw material | Range of variation of seeds with unreduced ANF content | | Seeds with reduced ANF content |
|---|---|---|---|---|
| | | Minimum | Maximum | |
| Fava bean *Vicia fava* L. | Lectins (g/100 g) | 2.00 | 13.30 | <0.10 |
| | Antitryptic factors (TIU/mg) | 1.90 | 10.00 | <1.50 |
| Pea *Pisum sativum* L. | Lectins (g/100 g) | 0.30 | 1.00 | <0.10 |
| | Antitryptic factors (TIU/mg) | 1.70 | 15.00 | <1.50 |

(TIU = trypsin inhibitory units)

An Improved Content of at Least One Evaluation Criterion:

| Evaluation criteria | Fava bean Vicia fava L. | Pea Pisum sativum L. | Lupin Lupinus spp. |
|---|---|---|---|
| Solubilized protein at basic pH (%)* | <55% | <55% | <55% |
| Gelatinized starch (%) | >50% | >50% | — |
| ED1 (%) | <50% | <50% | <60% |
| FA (%) | — | — | >40 |
| CML (g/kg DM) | <0.020 | <0.020 | <0.025 |
| Acrylamide (g/kg DM) | <110 | <110 | <300 |

*hereinbelow, the term "Solublized protein" means protein solubilized at basic pH.

An Improved Level of Digestibility of Energy and/or Protein and its Amino Acids:—for Monogastric Animals:

| | Energy Digestibility (% increase) | | | Protein/Amino acids Digestibility (% increase) | | |
|---|---|---|---|---|---|---|
| | Fava bean | Pea | Lupins | Fava bean | Pea | Lupins |
| Poultry | ME (Kcal) 20% | 20% | 25% | DUC (%) 8% | 5% | 8% |
| Pigs | DUC (%) 20% | 10% | 15% | DUC (%) 8% | 5% | 8% |
| Fish | DUC (%) 25% | 15% | 18% | DUC (%) 12% | 8% | 12% |
| Other species | % increase 20% | 10% | 15% | DUC (%) 8% | 4% | 6% |

(ME: metabolizable energy; DUC: digestive utilization coeficient)

For Ruminants:

| | Theoretical degradability (TD) (%) | | | Intestinal digestibility (dr) % | | |
|---|---|---|---|---|---|---|
| | Fava bean | Pea | Lupin | Fava bean | Pea | Lupin |
| Ruminants | <65 | <65 | <65 | >98 | >98 | >98 |

The results presented in the tables above compare with those obtained with a seed that has undergone only a fractionation step similar to the one described above and a granulation step at a temperature below 100° C. These results are also based on current animal genetics, i.e. breeds selected for their productivity.

They are the result of digestibility work carried out on monogastric species by in vivo chicken, fish and pork tests and for ruminants by in vivo tests. These tests are presented below.

Digestibility Tests a/ Standard Broiler Digestibility Test

On test farm, trial was conducted to determine the digestive nitrogen and energy utilization factor of standard broiler chickens. The objective is to evaluate the impact of fava bean seed selection and the technological treatment provided as described in the invention. The energy recovery and digestibility of the protein are calculated by difference as defined by Carré et al., 2013.

| | Characteristics of the invention | | | | | |
|---|---|---|---|---|---|---|
| | Fava bean A Whole Raw | Fava bean A Whole Cooked | Fava bean A Kernel Cooked | Fava bean B Whole Raw | Fava bean B Whole Cooked | Fava bean B Kernel Cooked |
| Seed selection | No | No | No | Yes | Yes | Yes |
| Technological seed treatment | No | Yes | Yes | No | Yes | Yes |
| | Characteristics of the fava bean seeds (in whole or decoated form) | | | | | |
| Protein, g/100 g DM | 29.2 | | 33.3 | 29.1 | | 32 |
| Starch, g/100 g DM | 39.7 | | 46.7 | 41.4 | | 49.8 |
| Tannins, g/100 g DM | 8.2 | | 2.1 | 5.8 | | 1.7 |
| Vicine + convicine, g/100 g DM | 7.8 | | 9.2 | 1.1 | | 0.3 |
| Alpha-galactosides, g/100 g DM | 5.2 | | 4.6 | 3.7 | | 3.1 |
| Crude fiber, g/100 g DM | 10.6 | | 0 | 7.2 | | 0 |
| NDF, g/100 g DM | 15.4 | | 0 | 10.5 | | 0.0 |
| Lectins, g/100 g DM | 7.7 | | 8.5 | 7.0 | | 7.7 |
| Antitryptic factors, TIU/mg | 5.2 | | 4.6 | 3.7 | | 3.1 |
| | Fava bean seed treatment processes | | | | | |
| Mixing | No | No | No | No | No | No |
| Fractionation | Yes | Yes | Yes | Yes | Yes | Yes |
| Hulling | No | No | Yes | No | No | Yes |

|  | Characteristics of the invention | | | | | |
|---|---|---|---|---|---|---|
|  | Fava bean A Whole Raw | Fava bean A Whole Cooked | Fava bean A Kernel Cooked | Fava bean B Whole Raw | Fava bean B Whole Cooked | Fava bean B Kernel Cooked |
| Heat treatment | | | | | | |
| Temperature | — | 140° C. | 130° C. | — | 140° C. | 130° C. |
| Duration | — | 20 s | 20 s | — | 20 s | 20 s |
| Pressure | — | 30 bars | 25 bars | — | 30 bars | 25 bars |
| Characteristics of the treated fava bean seeds | | | | | | |
| Lectins * | 6.7 | 0.0 | 0.0 | 6.1 | 0.0 | 0.0 |
| Antitryptic factors ** | 2.9 | 0.8 | 0.5 | 1.7 | 0.9 | 0.3 |
| Nutrient digestibility | | | | | | |
| DUC Total nitrogen | 73 | 76 | 76 | 72 | 79 | 80 |
| ME a N, kcal/kg MS | 2813 | 3068 | 3258 | 2890 | 3313 | 3477 |
| DUC Total nitrogen | 100 | 104 | 104 | 99 | 108 | 110 |
| DUC Energy | 100 | 109 | 116 | 103 | 118 | 124 |

Thus, by combining the best technologies, from seed selection to mechanical and thermomechanical processes, we manage to improve digestibility levels remarkably: +8% increase in protein digestibility, +18% increase in energy value in chicken, a highly sensitive species in terms of digestibility, making it an excellent model for monogastric animals. When hulling the fava bean seed is carried out in an advantageous way, a synergistic effect is noted on the use value of protein (+10%) and energy (+24%) after heat treatment. These effects are superior to a simple addition of a seed selection, hulling of the seed and an adapted heat treatment.

b/ Digestibility Test in Pigs

At an experimental farm, a trial to determine the fecal and ileal digestibilities of growing pigs was conducted. The digestive utilization of each test material was obtained using the difference method with measurements on the base diet and measurements on diets containing a fraction of the base diet and one of the test products.

To determine the fecal digestibility of pigs, the test is carried out according to a device described by Noblet et al. (1989). Briefly, the principle is to incorporate in a basic diet (wheat+soybean meal), 35% of one of the seeds to be tested and each of the diets thus prepared is distributed to 5 pigs.

|  | Characteristics of the fava bean seeds | | | | | | |
|---|---|---|---|---|---|---|---|
|  | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
| Seed selection | — | Yes | Yes | Yes | Yes | Yes | Yes |
| Technological seed treatment | — | No | Yes | Yes | No | Yes | Yes |
| Characteristics of the ration | | | | | | | |
| ME ration, kcal/kg | 5360 kcal/kg MS | | | | | | |
| Digestible protein, g/kg | 44 g/100 g DM | | | | | | |

|  | Characteristics of the fava bean seeds (in whole or decoated form) | | | | | | |
|---|---|---|---|---|---|---|---|
|  | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
| Protein, g/100 g MS | | | 31.4 | | | 36.1 | |
| Starch, g/100 g MS | | | 38.0 | | | 43.6 | |
| Tannins, g/100 g MS | | | 0.5 | | | 0.4 | |
| Vicine + convicine, g/100 g MS | | | 0.3 | | | 0.3 | |

| | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
|---|---|---|---|---|---|---|---|
| Characteristics of the fava bean seeds (in whole or decoated form) | | | | | | | |
| Alpha-galactosides, g/100 g MS | | | 2.6 | | | 2.9 | |
| Crude fiber, g/100 g MS | | | 7.0 | | | 1.4 | |
| NDF, g/100 g MS | | | 13.1 | | | 11.1 | |
| Lectins, g/100 g MS | | | 2.0 | | | 2.2 | |
| Antitryptic factors, TIU/mg | | | 1.9 | | | 2.1 | |
| Fava bean seed treatment processes | | | | | | | |
| Mixing | — | No | No | No | No | No | No |
| Fractionation | — | Yes | Yes | Yes | Yes | Yes | Yes |
| Hulling | — | No | No | No | Yes | Yes | Yes |
| Thermal preparation | | | | | | | |
| Temperature | — | — | — | 60° C. | — | — | 60° C. |
| Humidity | — | — | — | 14% | — | — | 14% |
| Duration | — | — | — | 15 min | — | — | 15 min |
| Heat treatment | | | | | | | |
| Temperature | — | — | 110° C. | 140° C. | — | 11° C. | 140° C. |
| Duration | — | — | 20 s | 20 s | — | 20 s | 20 s |
| Pressure | — | — | 20 bars | 30 bars | — | 20 bars | 30 bars |
| Characteristics of the treated seeds | | | | | | | |
| Lectins, g/100 g DM | — | 6.7 | 2.2 | 0.2 | 6.7 | 6.7 | 1.3 |
| Antitryptic factors, TIU/mg | — | 6.6 | 3.0 | 2.6 | 5.6 | 4.4 | 2.8 |
| Fecal digestive utilization coefficient (DUC) of foodstuffs | | | | | | | |
| DUC Total nitrogen | 84.9[bc] | 82.1[a] | 84.9[bc] | 84.2[b] | 84.1[b] | 88.3[d] | 88.0[cd] |
| Fecal digestive utilization coefficient (DUC) of seeds | | | | | | | |
| DUC Total nitrogen | — | 80.1 | 85.9 | 84.4 | 84.5 | 93.5 | 92.2 |

This trial highlights the advantage of the technological treatment (preparation and heat treatment) applied to the whole or decoated seed, as disclosed by the invention, to achieve a level of digestibility of the total nitrogen and energy statistically equivalent to the control diet based on soybean meal. The two heat treatments applied to the seed lead to substantially equivalent results. On the other hand, prior hulling of the selected fava bean seed allows, when it is not technologically treated, to reach the DUCs of total nitrogen and energy of the feed obtained with soybean meal. When the fava bean kernel is technologically treated, as the invention describes it in terms of advantage, the DUC is clearly and statistically superior to the soybean meal.

c/ Rainbow Trout Digestibility Test

In an experimental fish farm a trial to determine the metabolic utilization of energy and protein is conducted. Energy utilization and protein digestibility are calculated by difference as defined by Choubert et al., 1982. Selected and treated fava bean seeds and their digestive utilization coefficients are presented in the table below.

| | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
|---|---|---|---|---|---|---|---|
| Characteristics of the invention | | | | | | | |
| Seed selection | — | Yes | Yes | Yes | Yes | Yes | Yes |
| Technological seed treatment | — | No | Yes | Yes | No | Yes | Yes |
| Characteristics of the fava bean seeds (in whole or decoated form) | | | | | | | |
| Protein, g/100 g MS | | | 31.4 | | | 36.1 | |
| Starch, g/100 g MS | | | 38 | | | 43.6 | |

| | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
|---|---|---|---|---|---|---|---|
| | | | Characteristics of the invention | | | | |
| Tannins, g/100 g MS | | | 0.5 | | | 0.4 | |
| Vicine + convicine, g/100 g MS | | | 0.3 | | | 0.3 | |
| Alpha-galactosides, g/100 g MS | | | 2.6 | | | 2.9 | |
| Crude fiber, g/100 g MS | | | 7.0 | | | 1.4 | |
| NDF, g/100 g MS | | | 13.1 | | | 11.1 | |
| Lectins, g/100 g MS | | | 2 | | | 2.2 | |
| Antitryptic factors, TIU/mg | | | 1.9 | | | 2.1 | |
| | | | Fava bean seed treatment processes | | | | |
| Mixing | — | No | No | No | No | No | No |
| Fractionation | — | Yes | Yes | Yes | Yes | Yes | Yes |
| Hulling | — | No | No | No | Yes | Yes | Yes |
| Thermal preparation | | | | | | | |
| Temperature | — | — | — | 60° C. | — | — | 60° C. |
| Humidity | — | — | — | 14% | — | — | 14% |
| Duration | — | — | — | 15 min | — | — | 15 min |
| Heat treatment | | | | | | | |
| Temperature | — | — | 110° C. | 140° C. | — | 110° C. | 140° C. |
| Duration | — | — | 20 s | 20 s | — | 20 s | 20 s |
| Pressure | — | — | 20 bars | 30 bars | — | 20 bars | 30 bars |

| | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
|---|---|---|---|---|---|---|---|
| | | | Characteristics of the treated fava bean seeds | | | | |
| Lectins, g/100 g DM | — | 6.7 | 2.2 | 0.2 | 6.7 | 6.7 | 1.3 |
| Antitryptic factors, TIU/mg | — | 6.6 | 3.0 | 2.6 | 5.6 | 4.4 | 2.8 |
| Solubilized protein, %. | — | 71 | 51 | 23 | 58 | 35 | 24 |
| Gelatinized starch, %. | — | 7 | 66 | 83 | 7 | 68 | 85 |
| CML, g/kg DM | — | 0.007 | 0.016 | 0.021 | 0.008 | 0.018 | 0.023 |
| Acrylamide, g/kg DM | — | <30 | 35 | 62 | <30 | 38 | 65 |
| ED1, % | — | 81 | 36 | 35 | 85 | 46 | 39 |
| | | | Digestive utilzation coefficient (DUC) of raw materials | | | | |
| DUC Dry matter | 83.8 $^{cd}$ | 53.8 $^{a}$ | 68.5 $^{b}$ | 67.9 $^{b}$ | 72.4 $^{bc}$ | 71.7 $^{bc}$ | 78.7 $^{d}$ |
| DUC Energy | 84.7 $^{c}$ | 56.9 $^{a}$ | 70.8 $^{b}$ | 71.9 $^{b}$ | 74.6 $^{bc}$ | 77.1 $^{bc}$ | 83.4 $^{c}$ |
| DUC Protein | 97.4 $^{c}$ | 83.5 $^{a}$ | 89.3 $^{b}$ | 92.5 $^{bc}$ | 91.1 $^{b}$ | 93.5 $^{bc}$ | 96.7 $^{c}$ |
| DUC Starch | — | 74.5 $^{a}$ | 84.5 $^{b}$ | 81.4 $^{b}$ | 75.0 $^{a}$ | 75.8 $^{a}$ | 85.0 $^{b}$ |

In the table above and the following tables, values that have the same superscript letter are not significantly different at the 5% threshold.

The treatment of selected fava bean seeds by preparation and heat treatment processes leads to improved digestibility of dry matter, energy, protein and starch compared with untreated fava bean seeds. The two thermal processes lead to results that are not significantly different from each other. There is, however, a numerical difference in favor of preparation and further heat treatment (temperature, pressure).

The advantageous use of hulling of fava bean seeds, prior to heat treatment, allows further improvement in the digestibility of nutrients such as energy and protein, bringing it to the level of soybean meal.

This trial highlights the interest of the invention in the treatment of fava bean seeds on the digestibility of nutrients as well as the advantageous use of hulling, with a view to replacing soybean meal.

These results of intrinsic digestibility of the seeds, while they express the effects related to the technological process of the invention (synergy of seed selection and technological treatments), it should be remembered that they do not express the synergistic effects of the invention at the level of digestion by the animal. Some of the digestibility results are obtained according to the usual methods used in the preceding illustrations. On the other hand, other phenomena are involved in the outcome of digestion by the animal and have effects on the animal's metabolism. Indeed, if the antinutritional factors can be involved in the digestibility value of the seed, they are also the cause of digestive and metabolic disorders inducing decreases in intake and production performance, physiological disturbances and various pathologies. Thus, the present process has the advantage of not only achieving high levels of so-called digestibility of protein-rich seeds, but also to avoid poor performance and other health problems associated with the significant presence of antinutritional factors.

For example, the vicine and convicine of fava beans were shown to reduce egg weight and egg-laying intensity in laying hens. Lectins, on the other hand, have blood red blood cell agglutination properties that can result in growth retardation. And as for oligosaccharides, they are metabolized by the microorganisms of the colon and cause, due to their fermentation, discomfort at the digestive level (flatulence, diarrhea) likely to reduce feed intake causing a degradation of growth performance.

Thanks to these advantages, the invention has led to zootechnical results that were previously unrivalled in animal husbandry.

Below are presented several zootechnical trials that were carried out with different species and on different farms, allowing the technical advantages obtained by the invention to be validated under production conditions.

a/ Zootechnical Test in Laying Hens

In an experimental farm, 15% of a mixture of 90% fava bean seed and 10% flax seed from different processes with previously determined ME and DUC N values was fed to laying hens (Isa-Brown) for about 3 months.

In view of the chosen methodology, which consists of formulating laying feedstuffs in iso-nutrients (metabolizable energy, digestible essential amino acids, calcium, phosphorus, etc.) taking into account the differences in digestibility values assessed earlier, the aim of this trial was to check whether, thanks to the synergistic effect of a reduction in antinutritional factors (whose effects are not integrated into the digestibility values), the invention made it possible to obtain a higher level of zootechnical performance.

The table below thus presents:
- the nutritional characteristics retained for the fava bean resulting from the invention on the one hand and for the standard fava bean, having simply undergone a grinding on the other hand; these values were previously determined by the study of their digestibility according to the usual protocols known to the skilled person;
- laying performance in terms of egg weight, exported egg mass (taking into account the number of eggs laid) and consumption index (feed efficiency to produce an egg).

| | Characteristics of the invention | | | | | |
|---|---|---|---|---|---|---|
| | Soybean meal | Fava bean Whole Raw | Fava bean Whole Cooked 1 | Fava bean Whole Cooked 2 | Fava bean B Raw | Fava bean B Cooked 2 |
| Seed selection | — | No | No | No | Yes | Yes |
| Technological seed treatment | | No | Yes | Yes | No | Yes |
| Characteristics of the ration | | | | | | |
| ME ration, kcal/kg | 2800 | | | | | |
| Digestible Lys, g/kg | 6.9 | | | | | |
| Characteristics of the fava bean seeds | | | | | | |
| Protein, g/100 g MS | | | 29.2 | | | 29.1 |
| Starch, g/100 g MS | | | 39.7 | | | 41.4 |
| Tannins, g/100 g MS | | | 0.82 | | | 0.58 |
| Vicine + convicine, g/100 g MS | | | 0.78 | | | 0.11 |
| Alpha-galactosides, g/100 g MS | | | 3.0 | | | 2.4 |
| Raw cellulose, g/100 g MS | | | 10.6 | | | 7.2 |
| NDF, g/100 g MS | | | 18.9 | | | 15.4 |
| Lectins, g/100 g MS | | | 5.2 | | | 2.0 |
| Antitryptic factors, TIU/mg | | | 5.2 | | | 3.7 |

|  | Fava bean seed treatment processes | | | | | |
|---|---|---|---|---|---|---|
|  | Soybean meal | Fava bean Whole Raw | Fava bean Whole Cooked 1 | Fava bean Whole Cooked 2 | Fava bean B Raw | Fava bean B Cooked 2 |
| Mixing | — | No | No | No | No | No |
| Fractionation | — | Yes | Yes | Yes | Yes | Yes |
| Thermal preparation | | | | | | |
| Temperature | — | — | — | 60° C. | — | 60° C. |
| Humidity | — | — | — | 14% | — | 14% |
| Duration | — | — | — | 15 min | — | 15 min |
| Heat treatment | | | | | | |
| Temperature | — | — | 90° C. | 140° C. | — | 140° C. |
| Duration | — | — | 20 s | 20 s | — | 20 s |
| Pressure | — | — | 15 bars | 30 bars | — | 30 bars |
| Characteristics of the treated fava bean seeds | | | | | | |
| ME Fava bean seed, kcal/kg |  | 2813 | 2983 | 3068 | 2890 | 3313 |
| DUC N Fava, bean seed % |  | 73 | 75 | 76 | 72 | 79 |
| Lectins, g/100 g DM |  | 5.2 | 5.2 | 0.0 | 2.0 | 0.0 |
| Antitryptic factors, TIU/mg |  | 2.9 | 2.4 | 0.8 | 3.7 | 0.9 |
| Production performance of laying hens | | | | | | |
| Weight of eggs, g | 61.9 $^{bc}$ | 62.2 $^{ab}$ | 62.2 $^{ab}$ | 62.1$^{ab}$ | 62.6 $^{a}$ | 62.8 $^{a}$ |
| Export mass, g/d | 61.0 $^{ab}$ | 605 $^{b}$ | 59.7 $^{c}$ | 61.1$^{ab}$ | 602 $^{b}$ | 62.0 $^{a}$ |
| Consumption index | 1.92 $^{c}$ | 1.97$^{ab}$ | 2.00 $^{a}$ | 194 $^{b}$ | 1.97$^{ab}$ | 1.92$^{c}$ |

Compared with the control lot with soybean meal, which is already very well characterized in terms of digestibility values and production performance, it appears that:

The results obtained with the standard fava bean seed, which is not the result of the invention, are inferior to the "soybean meal" control, highlighting the negative effects of antinutritional factors on the hen's egg-laying performance. In fact, the main finding is that the hens in this batch had a lower mass of exported eggs despite a similar or even slightly higher egg weight, which means that they laid fewer eggs; but also that they had to consume more feed to produce the same quantity of eggs, a sign of a loss of feed efficiency (increase in consumption index).

The results obtained with standard fava bean seed, technologically treated but at a lower level than that of the invention, lead to lower production performance. The technological treatment applied to a non-selected seed is not effective enough to reduce the content of antinutritional factors and thus significantly increase the nutritional value of the seed.

The results obtained with the selected but not technologically treated fava bean seed lead to performances which, despite a higher intrinsic nutritional value than the non-selected seed, remain below the control lot with soybean meal. The fava bean seed cannot be well utilized by the laying hen without technological treatment.

While the nutritional value of the fava bean resulting from the invention (Trial Fava bean seed) was already significantly higher than the standard fava bean, the results obtained with the fava bean seed of the invention show an improvement in egg weight and exported mass, without modifying the consumption index.

This is how one observes the advantage of the selection and process according to the invention. Not only is the protein-rich seed of said process characterized by higher nutritional values in the context of so-called digestibility studies, but it also makes it possible to curb the harmful effects of antinutritional factors and at the same time to achieve higher production performances than soybean meal, signs of the synergistic effect sought at the step of utilization by the animal.

b/ Zootechnical and Economic Testing of Label Broiler Poultry

In a label-type chicken reference farm, two identical buildings with 4400 chickens were fed according to 2 feeding programs. The usual soybean meal-based program is compared with the soybean-free protein-rich seed-based program of the invention.

The technical and economic performance was evaluated on the basis of consumption, animal weight, growth, feed conversion, mortality and feed cost.

In this trial, the nutritional values of the fava bean used for food formulation were based not on the so-called digestibility values, but on values from the literature. The objective was therefore to check whether the zootechnical performance of the chickens was indeed superior to that of the control lot, and if it was, to calculate how much higher the nutritional values of the fava bean seed should have been. The elements are presented below:

|  | Characteristics of the invention | |
|---|---|---|
|  | Soybean meal | Fava bean Cooked |
| Seed selection | — | Yes |
| Technological seed treatment |  | Yes |
| Characteristics of the ration | | |
| ME ration, kcal/kg | 2800 | |
| Digestible Lys, g/kg | 6.9 | |

-continued

| Characteristics of the invention | | |
|---|---|---|
| | Soybean meal | Fava bean Cooked |
| Characteristics of the fava bean seeds | | |
| Protein, g/100 g MS | 51.6 | 29.2 |
| Starch, g/100 g MS | 5.7 | 41.8 |
| Tannins, g/100 g MS | 0.69 | 0.49 |
| Vicine + convicine, g/100 g MS | — | 0.15 |
| Alpha-galactosides, g/100 g MS | 4.0 | 2.2 |
| Crude fiber, g/100 g MS | 5.9 | 7.3 |
| NDF, g/100 g MS | 12.5 | 13.0 |
| Lectins, g/100 g MS | — | 2.4 |
| Antitryptic factors, TIU/mg | 20.0 | 3.0 |

| | Fava bean seed treatment processes | |
|---|---|---|
| | Soybean meal | Fava bean Cooked |
| Mixing | — | No |
| Fractionation | — | Yes |
| Thermal preparation | | |
| Temperature | — | 60° C. |
| Humidity | — | 14% |
| Duration | — | 15 min |
| Heat treatment | | |
| Temperature | — | 140° C. |
| Duration | — | 20 s |
| Pressure | — | 30 bars |
| Characteristics of the treated fava bean seeds | | |
| ME Fava bean seed, kcal/kg | — | 3305 |
| DUC N Fava bean seed, % | — | 78 |
| Lectins, g/100 g DM | — | 0.0 |
| Antitryptic factors, TIU/mg | — | 0.8 |
| Chicken production performance | | |
| Slaughter age, d | 82 | 82 |
| Final weight, kg | 2.184 | 2.349 *** |
| Average daily gain, g/d | 26.63 | 28.65 *** |
| Economic consumption index | 2.913 | 2.740 *** |
| Kg products/m² | 23.46 | 25.10 ** |
| Water/Feed ratio | 1.40 | 1.43 * |
| Performance Index | 89.3 | 101.5 *** |
| Cost of food program, €/t | 295.00 | 300.80 |
| Total food cost, base 100 | 100 | 102.63 |
| Chick margin-feed, base 100 | 100 | 121.10 |

Thus, the technical results obtained thanks to the invention have largely compensated for the additional food costs.

Thus, the substitution of soybean meal by the solution proposed according to the invention up to 8% of the feed resulted in a significant improvement in technical (weight +7.5%, GMQ +7.6%, CI −5.9% and performance index +13.9%) and economic performance.

According to these zootechnical results, the digestibility values of the solution according to the invention cannot alone explain the improved performance. In fact, while the digestibility results were evaluated at 3313 kcal of metabolizable energy and 79% of the digestive utilization coefficient of the protein, by calculation, the performances thus obtained make it possible to estimate an increase of 11% of the metabolizable energy (i.e. 3675 kcal) and of 5% of the digestive utilization coefficient of the protein (i.e. 83%).

This is an indication of a synergistic effect related to a better expression at the level of the animal's metabolism, which can be linked to the reduction of antinutritional factors.

c/ Zootechnical, Environmental and Economic Testing in Standard Broiler Chicken

At an experimental farm, a trial to determine the growth performance of broiler chickens was conducted. This trial was conducted on ROSS PM3 male chickens fed feed where the main protein sources were soybean meal or non-selected and non-technologically treated fava bean seeds (Raw fava bean) or bean seeds from the invention (selection & technological treatment) called "Cooked Bean". These protein sources were incorporated up to 15% in the growth feed (ME: 2950 kcal/kg; digestible LYS: 11 g/kg) and 20% in the finishing feed (ME: 3000 kcal/kg; digestible LYS: 10 g/kg). These feeds had the same nutritional characteristics as SOYBEAN. The zootechnical performances were noted, and the environmental (ECOALIM) and economic (2018 economic situation) impacts of these products were determined.

| | Characteristics of the invention | | |
|---|---|---|---|
| | Soybean meal | Fava bean Raw | Fava bean Cooked |
| Seed selection | | No | Yes |
| Technological seed treatment | | No | Yes |
| Characteristics of the ration | | | |
| ME ration, kcal/kg | Growth: 2950 | Finish: 3000 | |
| Digestible lys, g/kg | Growth: 11 | Finish: 10 | |

| | Characteristics of the fava bean seeds | | |
|---|---|---|---|
| | Soybean meal | Fava bean Raw | Fava bean Cooked |
| Protein, g/100 g MS | | 29.2 | Yes |
| Starch, g/100 g MS | | 39.7 | 43.2 |
| Tannins, g/100 g MS | | 0.82 | 0.54 |
| Vicine + convicine, g/100 g MS | | 0.78 | 0.29 |
| Alpha-galactosides, g/100 g MS | | 3.0 | 2.4 |
| Crude fiber, g/100 g MS | | 10.6 | 8.8 |
| NDF, g/100 g MS | | 18.9 | 18.7 |
| Lectins, g/100 g MS | | 5.2 | 3.0 |
| Antitryptic factors, TIU/mg | | 5.2 | 2.5 |

|  | Soybean meal | Fava bean Raw | Fava bean Cooked |
|---|---|---|---|
| Characteristics of the fava bean seeds | | | |
| Fava bean seed treatment processes | | | |
| Mixing | — | No | No |
| Fractionation | — | Yes | Yes |
| Thermal preparation | | | |
| Temperature | — | — | 60° C. |
| Humidity | — | — | 14% |
| Duration | — | — | 15 min |
| Heat treatment | | | |
| Temperature | — | — | 140° C. |
| Duration | — | — | 20 s |
| Pressure | — | — | 30 bars |
| Characteristics of the treated fava bean seeds | | | |
| ME Fava bean seed, kcal/kg | | 2813 | 3313 |
| DUC N Fava bean seed, % | | 73 | 79 |
| Lectins, g/100 g DM | | 5.2 | 0 |
| Antitryptic factors, TIU/mg | | 2.9 | 0.9 |
| Chicken production performance | | | |
| Consumption index | 1.456 | 1.460 | 1.444 |
| Environmental performance | | | |
| Phosphorus consumption | 100 | 79 | 64 |
| Fossil energy consumption | 100 | 84 | 79 |
| Climate change | 100 | 72 | 59 |
| Acidification | 100 | 82 | 83 |
| Eutrophication | 100 | 102 | 99 |
| Land use | 100 | 119 | 114 |
| Economic performance | | | |
| Food cost for the production of 100 kg live weight | 40.20 € | 39.03 € | 39.45 € |
| Annual cost of chicken consumption | 7.64 € | 7.42 € | 7.50 € |

The growth performance of the chickens in the batches Soybean meal, Raw and Cooked Bean, having consumed iso-nutritional feed, is statistically identical. The consumption indices, although not significantly different, show values that are numerically in favor of the fava bean from the invention. The latter has a lower consumption index (1.444) than the Soybean Meal (1.456) and Raw Fava Bean (1.460) lots. Identical growth performances observed when standard broilers have a feed with the same nutritional values in their trough means that these feeds were correctly estimated on their nutritional component. These results validate the digestible ME and LYS contents of the trial fava beans and particularly those from the invention. And to a lesser extent than in laying hens, we highlight a synergistic effect of the invention through animal performance.

The environmental impact of the production of chicken with a fava bean-based feed from the invention is, positive on climate change (−41%), phosphorus consumption (−36%), fossil energy consumption (−22%) and acidification (−18%); neutral on eutrophication (−2%) and negative on land use (+13%). The same environmental impacts of the production of chicken with non-invented fava beans have intermediate values.

The economic impact of broiler production, assessed through the feed-related part which represents about two thirds of production costs, is 40.20 € and 39.45 €/100 kg live weight, i.e. a decrease of −1.9%. On the basis of French chicken consumption, which is 19.0 kg/year, the impact is equally neutral, since it saves 0.14 €/year. The economic impact of the production and consumption of chicken fed with seeds not derived from the invention is less.

This trial shows the dual advantage of the invention in the selection of fava bean seeds and in an adapted technological treatment. This interest relates both to the utilization by the standard broiler chicken of the fava bean resulting from the invention, and to its beneficial environmental weight for the invention, as well as its economic weight for the French consumer. The introduction of protein-rich seeds resulting from the invention is thus validated on the standard broiler chicken.

d/ Animal Husbandry Test in Rainbow Trout

At an experimental farm, a trial to determine the growth performance of rainbow trout was conducted. The nutritional values of fava bean seeds selected as described in the invention, technologically treated or not as described in the invention and decoated or not, were previously evaluated in rainbow trout juveniles reared at 17° C. in fish farm.

The foods, iso-energetic (23-24 kJ/g DM) and iso-nitrogenous (43-45% DM), contained as a source of protein 21% fishmeal and 25% fava bean seeds to be tested or 25% soybean meal. After mixing and grinding of the raw materials constituting the fish feed, the fish feed underwent a thermo-cooking process in a twin-screw extruder and was then granulated. These feeds were distributed to batches of trout, ad libitum, for 84 days.

| | Characteristics of the invention | | | | | | |
|---|---|---|---|---|---|---|---|
| | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
| Seed selection | — | Yes | Yes | Yes | Yes | Yes | Yes |
| Technological seed treatment | — | No | Yes | Yes | No | Yes | Yes |
| Characteristics of the ration | | | | | | | |
| ME ration, kcal/kg | 5360 kcal/kg MS | | | | | | |
| Digestible protein, g/kg | 44 g/100 g DM | | | | | | |

| | Characteristics of the fava bean seeds (in whole or decoated form) | | | | | | |
|---|---|---|---|---|---|---|---|
| | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
| Protein, g/100 g MS | | 31.4 | | | 36.1 | | |
| Starch, g/100 g MS | | 38.0 | | | 43.6 | | |
| Tannins, g/100 g MS | | 0.5 | | | 0.4 | | |
| Vicine + convicine, g/100 g MS | | 0.3 | | | 0.3 | | |
| Alpha-galactosides, g/100 g MS | | 2.6 | | | 2.9 | | |
| Raw cellulose, g/100 g MS | | 7.0 | | | 1.4 | | |
| NDF, g/100 g MS | | 13.1 | | | 5.5 | | |
| Lectins, g/100 g MS | | 2.0 | | | 2.2 | | |
| Antitryptic factors, TIU/mg | | 1.9 | | | 2.1 | | |
| Fava bean seed treatment processes | | | | | | | |
| Mixing | — | No | No | No | No | No | No |
| Fractionation | — | Yes | Yes | Yes | Yes | Yes | Yes |
| Hulling | — | No | No | No | Yes | Yes | Yes |
| Thermal preparation | | | | | | | |
| Temperature | — | — | — | 60° C. | — | — | 60° C. |
| Humidity | — | — | — | 14% | — | — | 14% |
| Duration | — | — | — | 15 min | — | — | 15 min |
| Heat treatment | | | | | | | |
| Temperature | — | — | 110° C. | 140° C. | — | 110° C. | 140° C. |
| Duration | — | — | 20 s | 20 s | — | 20 s | 20 s |
| Pressure | — | — | 20 bars | 30 bars | — | 20 bars | 30 bars |
| Characteristics of the treated fava bean seeds | | | | | | | |
| DUC Protein, % | 97.4 | 83.5 | 89.3 | 92.5 | 91.1 | 93.5 | 96.7 |
| DUC Energy, % | 84.7 | 56.9 | 70.8 | 71.9 | 74.6 | 77.1 | 83.4 |
| Lectins, g/100 g DM | — | 6.7 | 2.2 | 0.2 | 7.3 | 6.7 | 1.3 |
| Antitryptic factors, TIU/mg | — | 6.6 | 3.0 | 2.6 | 7.2 | 4.4 | 2.8 |
| | | | | 35 | | | 24 |

| | Trout production performance | | | | | | |
|---|---|---|---|---|---|---|---|
| | Soybean meal | Fava bean Whole Raw | Fava bean Whole Cooked 1 | Fava bean Whole Cooked 2 | Fava bean Kernel Raw | Fava bean Kernel Cooked 1 | Fava bean Kernel Cooked 2 |
| Consumption index | 3.17 | 3.18 | 3.17 | 3.18 | 3.49 | 3.14 | 3.20 |
| Relative daily consumption | $1.24^{ab}$ | $1.33^{b}$ | $1.26^{b}$ | $1.28^{ab}$ | $1.36^{ab}$ | $1.20^{bc}$ | $1.20^{a}$ |
| Food efficiency | $1.13^{ab}$ | $1.05^{a}$ | $1.11^{ab}$ | $1.11^{ab}$ | $1.11^{ab}$ | $1.14^{ab}$ | $119^{b}$ |
| Protein efficiency | $2.65^{ab}$ | $2.52^{ab}$ | $2.69^{a}$ | $2.67^{ab}$ | $2.58^{ab}$ | $2.73^{ab}$ | $288^{b}$ |

No difference in zootechnical performance compared with the SOYBEAN control, however the technological treatments significantly impact feed consumption and feed efficiency of the feed containing the seeds derived from the invention: (i) the preparation and heat treatment, as disclosed by the invention, improves feed efficiency and protein efficiency, related to a decrease in feed consumption. (ii) hulling coupled with heat treatment also improves food efficiency.

In the context of this trial, the incorporation of 25% in the feed of the fava bean seeds resulting from the invention, in comparison with soybean meal and in iso-nutritional formulas, made it possible to achieve the same levels of trout growth performance. It even appears that certain advantageous combinations of technological treatments have had a positive impact on the fava bean seeds by improving their feed efficiency to the point where they are superior to soybean meal. More generally, this illustration shows the synergistic effect of the invention through the utilization that the animal was able to make of these selected and treated seeds.

These results therefore show that the fava bean seeds resulting from the invention are good candidates to replace soybean meal in trout feeds. Moreover, although aquaculture feeds are produced by cooking-extrusion, using a heat treatment under pressure, it appears that the process according to the invention, applied to whole or decoated fava bean seeds, provides real added value in order to improve the nutritional value of these seeds.

e/ Zootechnical Trial in Pork Butcher's Pigs

In a reference farm of fattening pigs, we compared the growth performance of two batches of pigs whose feed was differentiated only by the contribution of the solution resulting from the invention.

The growth and finishing feeds of both batches had iso-nutrient intakes (net energy and digestible amino acids). Said solution was provided up to 10% in the growth phase and 5% in the finishing phase, replacing protein cakes and oilseeds.

As the nutritional values of the fava bean used in the feed formulation were based on digestibility values, the aim was to check whether the zootechnical performance of the animals was equal and, if it was higher, to see if there was a possible synergistic effect linked to a better expression at the level of the animal's metabolism.

The table below shows the technical performance data obtained.

| | Characteristics of the invention | |
|---|---|---|
| | Soybean meal | Fava bean Cooked |
| Seed selection | — | Yes |
| Technological seed treatment | | Yes |
| | Characteristics of the ration | |
| ME ration, kcal/kg | Growth: 2300 | Finish: 2150 | |
| Digestible Lys, g/kg | Growth: 7.5 | Finish: 6.5 | |
| | Characteristics of the raw materials tested | |
| Protein, g/100 g MS | | 29.2 |
| Starch, g/100 g MS | | 41.8 |
| Tannins, g/100 g MS | | 0.49 |
| Vicine + convicine, g/100 g MS | | 0.15 |
| Alpha-galactosides, g/100 g MS | | 2.2 |
| Raw cellulose, g/100 g MS | | 7.3 |
| NDF, g/100 g MS | | 13.0 |
| Lectins, g/100 g MS | | 2.4 |
| Antitryptic factors, TIU/mg | | 3.0 |
| | Fava bean seed treatment processes | |
| Mixing | — | No |
| Fractionation | — | Yes |
| Thermal preparation | | |
| Temperature | — | 60° C. |
| Humidity | — | 14% |
| Duration | — | 15 min |
| Heat treatment | | |
| Temperature | — | 140° C. |
| Duration | — | 20 s |
| Pressure | — | 30 bars |
| | Characteristics of the treated fava bean seeds | |
| ME Fava bean seed, kcal/kg | | 3305 |
| DUC N Fava bean seed, % | | 78 |
| Lectins, g/100 g DM | | 0.0 |
| Antitryptic factors, TIU/mg | | 0.8 |
| | Production performance of pigs | |
| Average daily gain, g/d | 773 | 804 ** |
| Economic consumption index | 2.78 | 2.80 * |

The technical performances noted in this trial show an increase in the average daily gain, due to a better intake and an equally good added value in weight gain of one kilogram of feed.

This shows a synergistic effect between the good digestibility of the seeds on the one hand, and the positive effect on intake on the other hand, the latter effect can be linked to the reduction of antinutritional factors whose negative effects on food intake are regularly reported, due to the digestive disorders they cause in particular.

As mentioned above, post-digestion effects of nutrients such as protein and energy may occur in animals after they have ingested plant raw materials, depending on whether or not they are derived from the invention. Previous work has reported reduced performance of productions resulting from altered physiological functions and/or digestibility. Among these alterations in health, allergic reactions may occur. Protein-rich seeds have many documented cases of reactions following ingestion of these seeds due to major allergens present in the seeds.

f/ Dog allergenicity test

The objective of this work is to study the allergenicity of raw or treated fava bean seeds under different conditions. Allergenicity (or reactivity) was assessed by immunoblot using sera from food-sensitized dogs.

After extracting protein from the seeds and selecting sera from food-sensitive dogs-those with immunoglobulin type E or IgE reactive to protein-rich seeds-reactivity is studied by immunoblot. The extracted proteins are incubated in the presence of sera containing IgE. When an allergenic protein is present, it is bound by IgE in the serum and a specific band appears on the membrane.

| | Characteristics of the invention | | |
|---|---|---|---|
| | Soybean meal | Fava bean Whole Raw | Fava bean Whole Cooked | Fava bean Kernel Cooked |
| Seed selection | — | Yes | Yes | Yes |
| Technological seed treatment | | No | Yes | Yes |
| | Characteristics of the fava bean seeds (in whole or decoated form) | | |
| Protein, g/100 g MS | | 29.2 | | 36.1 |
| Starch, g/100 g MS | | 41.8 | | 43.6 |
| Tannins, g/100 g MS | | 0.49 | | 0.4 |
| Vicine + convicine, g/100 g MS | | 0.15 | | 0.3 |
| Alpha-galactosides, g/100 g MS | | 2.2 | | 2.9 |
| Raw cellulose, g/100 g MS | | 7.3 | | 1.4 |
| NDF, g/100 g MS | | 13.0 | | 5.5 |
| Lectins, g/100 g MS | | 2.4 | | 2.2 |

-continued

| | Characteristics of the invention | | |
|---|---|---|---|
| | Soybean meal | Fava bean Whole Raw | Fava bean Whole Cooked | Fava bean Kernel Cooked |
| Antitryptic factors, TIU/mg | | | 3.0 | 2.1 |
| | Fava bean seed treatment processes | | |
| Mixing | — | No | No | No |
| Fractionation | — | Yes | Yes | Yes |
| Thermal preparation | | | | |
| Temperature | — | — | 60° C. | 60° C. |
| Humidity | — | — | 14% | 14% |
| Duration | — | — | 15 min | 15 min |
| Heat treatment | | | | |
| Temperature | — | — | 140° C. | 130° C. |
| Duration | — | — | 20 s | 20 s |
| Pressure | — | — | 30 bars | 25 bars |

Raw fava bean seeds show many very intense bands, i.e. a strong allergic reactivity. On the other hand, the seeds resulting from the invention, from whole seeds or from decoated seeds, show no reactivity (no visible bands). It appears that the IgE reactivity initially present in the seeds is profoundly reduced or even suppressed at the end of the process of the invention.

g/ Zootechnical Test in Dairy Cows

On an experimental dairy cow farm, a trial was conducted to test the effects of the invention on the protection of fava bean and lupin seed proteins in the rumen and their digestibility in the intestine.

The trial was carried out on eight lactating Holstein cows fitted with a ruminal cannula. The experimental design was a 4×4 double Latin square. The cows were fed twice a day a ration consisting of 60% forage and 40% concentrates. Forage was a mixture of corn silage (33% of the ration in DM), grass silage (17%), hay (10%) and dried beet pulp (10.75%). The concentrate consisted of ground corn and soybean meal for the control diets. The cake was substituted according to the treatment with whole bean seeds, respectively white lupin seeds, raw (FAV-ENT-RAW and LUP-NT-RAW) or treated according to the invention (FAV-ENT-INVENTION and LUP-ENT-INVENTION) or treated according to an alternative process pushing the treatment temperatures beyond the recommendations of the invention (FAV-ENT-ALTER and LUP-ENT-ALTER). The diets were formulated to be iso-total nitrogen (TN) (146 g/kg DM) and iso-net energy (0.99 UFL/kg DM), and the concentrate provided 40% of the TN of the ration.

| | | Characteristics of the invention | | | | | |
|---|---|---|---|---|---|---|---|
| | SOYBEAN | FAV-ENT-RAW | FAV-ENT-ALTER | FAV-ENT-INVENTION | LUP-ENT-RAW | LUP-ENT-ALTER | LUP-ENT-INVENTION |
| Seed selection | Soybean meal | Yes | Yes | Yes | Yes | Yes | Yes |
| Technological seed treatment | | No | No | Yes | No | No | Yes |
| | | Characteristics of the ration | | | | | |
| TN g/kg MS | | | | 146 | | | |
| Net energy UFL/kg MS | | | | 0.99 | | | |
| Protein digestible in the intestine (PDI) g/kg | 92 | 80 | 99 | 91 | 80 | 100 | 92 |

-continued

| | Characteristics of the invention | | | | | | |
|---|---|---|---|---|---|---|---|
| | SOYBEAN | FAV-ENT-RAW | FAV-ENT-ALTER | FAV-ENT-INVENTION | LUP-ENT-RAW | LUP-ENT-ALTER | LUP-ENT-INVENTION |
| Rumen protein balance (BalProRU) g/kg | 3.47 | 14.82 | −2.33 | 5.5 | 15.54 | −2.61 | 5.71 |
| Protein digestible in the intestine from food (PDIF) g/kg | 44 | 30 | 51 | 42 | 30 | 52 | 42 |
| Rumen degradable starch g/kg | 155 | 162 | 153 | 153 | 123 | 123 | 123 |
| Digestible lysine % PDI | 6.82 | 7.18 | 7.09 | 7.1 | 6.85 | 6.51 | 6.44 |
| Digestible methionine % PDI | 2.53 | 2.62 | 2.29 | 2.38 | 2.67 | 2.31 | 2.42 |

| | Characteristics of fava bean or lupine seeds | | | | | | |
|---|---|---|---|---|---|---|---|
| | SOYBEAN | FAV-ENT-RAW | FAV-ENT-ALTER | FAV-ENT-INVENTION | LUP-ENT-RAW | LUP-ENT-ALTER | LUP-ENT-INVENTION |
| Protein, g/100 g DM | 51.6 | 29.3 | | | 33.3 | | |
| Starch, g/100 g DM | 5.7 | 39.1 | | | — | | |
| Fat, g/100 g DM | 1.6 | 7.0 | | | 13.3 | | |
| Tannins, g/100 g DM | 0.69 | 0.8 | | | — | | |
| Vicine + convicine, g/100 g DM | — | 0.10 | | | — | | |
| Alkaloids, g/100 g DM | — | — | | | 0.02 | | |
| Alpha-galactosides, g/100 g DM | 4.0 | 2.3 | | | 0.93 | | |
| Crude fiber, g/100 g DM | 5.9 | 10 | | | 12.9 | | |
| NDF, g/100 g DM | 12.5 | 18.7 | | | 18.3 | | |
| Lectins, g/100 g DM | — | 66.7 | | | — | | |
| Antitryptic factors, TIU/mg | 20.0 | 2.5 | | | — | | |
| Seed treatment processes | | | | | | | |
| Mixing | — | No | No | No | No | No | No |
| Fractionation | — | Yes | Yes | Yes | Yes | Yes | Yes |
| Thermal preparation | | | | | | | |
| Temperature | — | — | 60° C. | 60° C. | — | 60° C. | 60° C. |
| Humidity | — | — | 14% | 14% | — | 14% | 14% |
| Duration | — | — | 15 min | 15 min | — | 15 min | 15 min |
| Heat treatment | | | | | | | |
| Temperature | — | — | 160° C. | 140° C. | — | 160° C. | 140° C. |
| Duration | — | — | 20 s | 20 s | — | 20 s | 20 s |
| Pressure | — | — | 40 bars | 30 bars | — | 30 bars | 20 bars |
| Characteristics of the treated seeds | | | | | | | |
| Lectins, g/100 g DM | — | 66.7 | 28.6 | 13.3 | — | — | — |
| Antitryptic factors, TIU/mg | — | 2.5 | 1.0 | 0.9 | — | — | — |
| | 30 | 82 | 35 | 35 | 84 | 53 | 47 |
| Acrylamide, g/100 g DM | 34 | 35 | 39 | 69 | 34 | 507 | 175 |
| CML, g/100 g DM | 0.123 | 0.008 | 0.023 | 0.017 | 0.009 | 0.029 | 0.023 |

-continued

| | Characteristics of fava bean or lupine seeds | | | | | |
|---|---|---|---|---|---|---|
| | SOYBEAN | FAV-ENT-RAW | FAV-ENT-ALTER | FAV-ENT-INVENTION | LUP-ENT-RAW | LUP-ENT-ALTER | LUP-ENT-INVENTION |

| | Performance of the treated fava bean seeds | | | | | |
|---|---|---|---|---|---|---|
| | SOYBEAN | FAV-ENT-RAW | FAV-ENT-ALTER | FAV-ENT-INVENTION | LUP-ENT-RAW | LUP-ENT-ALTER | LUP-ENT-INVENTION |
| Apparent digestibility N, g/g | 0.63 (Fav)/ 0.66 (Lup) | 0.64 | 0.63 | 0.66 | 0.68 | 0.64 | 0.68 |
| Total amino acids, µM (plasma) | 2662 (Fav)/ 2642 (Lup) | 2401 | 2858 | 2985 | 2608 | 2411 | 2921 |
| Essential amino acids, µM (plasma) | 1034 (Fav)/ 956 (Lup) | 898 | 1125 | 1164 | 774 | 914 | 1024 |
| NH3, mg/L (Rumen juice) | 119 (Fav)/ 120 (Lup) | 145 | 130 | 133 | 140 | 125 | 140 |
| Dairy protein yield: Observed - Potential, g/day | 11.3 (Fav)/ −2.7 (Lup) | −65.0 | −56.9 | 5.1 | −68.6 | −67.9 | −29.7 |

The lower levels of ruminal $NH_3$ with seeds from the invention than with raw seeds show a protection of nitrogen from ruminal degradability, increased by the increase in temperature, whereas soybean meal leads to the lowest values. This protection of nitrogen thanks to the technological treatment is also confirmed by the 1 h enzymatic degradability, which decreases between the raw seeds and the seeds resulting from the invention.

The content of Maillard compounds is higher in seeds resulting from the invention than in raw seeds, with in particular a more marked effect on the acrylamide and CML content for lupin Moreover, the CML content of soybean meal is four to seven times higher than that of the seeds resulting from the invention.

In the fava bean Latin square, the CML content of the feces was lower in the fava bean diets than in the control diet containing soybean meal. Numerically, more Maillard compounds were found in the feces with the seeds from the alternative diets than with the seeds from the invention. This implies that in the alternative processes, the Maillard reactions were more likely to reach a non-reversible step in the abomasum, resulting in overprotection of nitrogen. This is confirmed by the decrease in the apparent digestibility of nitrogen observed with seeds from alternative processes compared with seeds from the invention. Also, the higher plasma content of amino acids with the seeds resulting from the invention compared with the seeds resulting from alternative processes on the one hand, and soybean meal on the other hand, demonstrates the better intestinal assimilation of the proteins of the seeds resulting from the invention; thus a lower availability of the proteins of the seeds resulting from alternative processes or of the proteins resulting from soybean meal to the animal is observed, because a higher proportion of the latter would escape not only from ruminal degradation but also from intestinal digestion and absorption.

These results confirm that Maillard reactions occurred following technological treatments of fava bean and lupin seeds, in varying proportions. In the case of the seeds resulting from the invention, these reactions allow the protection of nitrogen from excessive ruminal degradability and are reversible with the acid pH of the abomasum, thus allowing optimal absorption of amino acids in the small intestine. On the other hand, at high temperature (160° C.), these reactions are no longer as reversible in the abomasum, and the proteins, thus "too" protected, are no longer absorbed in the intestine.

Finally, in zootechnical terms, the seeds resulting from the invention are the only ones to rival soybean meal since they have made it possible to express the potential for milk protein yield of cows. This is not the case for raw seeds and seeds from alternative processes.

h/ Economic Interest Study of the Process According to the Present Invention

In order to carry out this economic analysis, feed formulation software was used, with appropriate information on available raw materials, nutritional values of the raw materials, prices of these raw materials and nutritional constraints of feeds for broilers and layers at different physiological steps of production.

Thus, after having informed the nutritional values and potential prices of the best combinations of the invention, the predisposition of the invention to be economically viable was assessed.

By this same approach, it was also possible to evaluate the prices of interest of the raw materials developed from the best combinations of processes resulting from the invention. And from there it was found that the invention was quite economically relevant, especially since formulation constraints related to specific specifications are present (specifications considered relating to the obligation to have in the feed formulas non-GMO raw materials, not imported or of local origin).

Below are presented three feed formulas for growing broilers showing the economic favor given to the solution resulting from the invention (a mixture of fava bean and soybean seeds, at a rate of 90% and 10% respectively), due to its technical-economic priority in terms of inclusion by optimization in non-GMO formulas, compared with the known raw materials of the prior art (soybean meal and cereals in this case).

Comparison table of three non-GMO growth feed formulas for broilers: one without and the other two with the solution resulting from the invention.

|  | Standard Formula WITHOUT proposal of the solution of the invention | Trial Formula 1 WITH proposal of the solution of the invention | Trial Formula 2 WITH proposal of the solution of the invention |
|---|---|---|---|
| Composition of the formulas ||||
| Non-GMO soybean meal | 21.0% | 8.3% |  |
| Solution of the invention (90% fava bean seed + 10% soybean) |  | 13.5% | 20.0% |
| Rapeseed cake |  | 6.3% | 8.0% |
| Wheat | 41.9% | 45.0% | 45.0% |
| Barley |  |  | 11.1% |
| Corn | 25.0% | 14.3% | 1.3% |
| Corn gluten | 5.2% | 5.7% | 7.6% |
| Soybean oil | 4.0% | 4.0% | 4.0% |
| Minerals & Vitamins | 2.3% | 2.3% | 2.3% |
| Amino acids | 0.6% | 0.6% | 0.7% |
| Nutritional characteristics ||||
| Metabolizable energy | 3100 kcal | 3100 kcal | 3100 kcal |
| Protein | 19.5% | 19.5% | 19.5% |
| Digestible lysine | 10.3 g/kg | 10.3 g/kg | 10.3 g/kg |
| Calcium | 0.79% | 0.79% | 0.79% |
| Phosphorus | 0.40% | 0.40% | 0.40% |
| Cost price | 289.5 €/t | 287.1 €/t | 288.5 €/t |

Through this formulation exercise, it can be seen that the solution of the invention is optimized in anon-GMO growth feed formula for broiler chicken, and is 13.5% in the Trial Formula 1, resulting in an inclusion of rapeseed meal of 6.3% and a significant decrease in soybean meal and corn meal of 12.7% and 10.3% respectively.

Also, if one seeks to completely remove the non-GMO soybean meal from the Trial Formula 2, the solution of the invention comes in at 20% while the cost price of the formula remains 1 €/t lower compared with the initial standard formula.

This formulation study demonstrates the technical and economic viability of the invention.

Finally, in terms of applications, the process constituting the subject matter of the invention aims to promote the inclusion of protein-rich seeds in the diet of monogastric animals as a substitute for other sources of protein such as soybean meal or other imported meal, and thus meet the demands of breeders for greater protein autonomy at the territorial level, and the demands of consumers for access to more sustainable livestock products, fed without GMOs, and whose food is of local origin.

The field of application of the present process may concern two types of use for animal husbandry:

Use in the Preparation of a Raw Material

Preparation of a concentrate based on protein crops, becoming a raw material, for incorporation into complete or complementary feed for monogastric animals and intended for industrial and/or farm feed manufacturers. In this case, the minimum incorporation of said selected seeds is 20%, preferentially 40%.

The other raw materials making up the concentrate may undergo all or part of the steps of said invention, all the more so if the latter confers an advantage on these raw materials.

Thus, the raw materials to be preferred are seeds or any other starchy product such as cereals, and oilseeds in a non-limiting way.

Use in the Preparation of a Foodstuff

Preparation of a complete or complementary cereal feed for livestock breeders to feed their monogastric animals. In this other case, the minimum incorporation of said selected seeds is 5%, preferentially 10%.

Also, the food solutions resulting from the invention differ according to the needs of food manufacturers and breeders, depending on whether they are positioned for non-GMO, locally produced, French or soy-free sectors on the one hand, or for the sector called "Bleu Blanc Cœur" (registered trademark) on the other.

Indeed, in the case of French protein requirements, it is preferable to treat the fava bean in association with metropolitan soybean. Whereas to meet the "Bleu-Blanc-Cœur" specifications, it is in our interest to associate it with flax seed.

In the first case, the soybean is used to concentrate the protein content of the product. In the second case, the flax seed provides the omega-3 traced and guaranteed. This approach has the advantage, within the framework of use by food manufacturers, of not requiring an additional storage cell, but of replacing another flax-based product, which is often associated with a raw material support without much technical interest (wheat bran, cereals . . . ).

Here is an example of solutions:

1/ Formulas for non-GMO/local protein supply chains:
Based on 90% fava bean seeds and 10% soybeans;
Based on 70% fava bean seeds and 30% soybeans.

2/ Formulas for the Bleu-Blanc-Cœur approach:
Based on 75% fava bean seeds and 25% flax seeds;
Based on 50% fava bean seeds and 50% flax seeds;
Based on 25% fava bean seeds and 75% flax seeds.

The use of seeds resulting from the invention may find value in domestic animals and ruminants. Although they were developed for feeding to monogastric livestock, seeds treated in accordance with the invention are fully usable in the feeding of domestic animals such as dogs and cats, and ruminants.

In an advantageous way for use by ruminants, the interest of using on the one hand carbohydrate-degrading enzymes and on the other hand sources of so-called reducing sugars can be retained. Indeed, beyond the thermal effect, one way of protecting the protein from its ruminal degradability while improving its intestinal digestibility consists: 1) in the hydrothermal and enzymatic preparation step of the process, of adding enzymes capable of hydrolyzing the carbohydrates into glucose units or other simpler reducing sugars that are reactive towards the protein; and/or 2) in the complementary step based on the use of additional raw material, of retaining sources of more or less reducing sugars.

The skilled person knows that the utilization of protein-rich seeds in ruminants requires in particular a reduction in the ruminal degradability of their protein, and that one of the ways to achieve this is to provoke the first steps of the Maillard reaction, between the amine functions of proteins and the reducing functions of sugars.

The invention proposes to create new conditions for the implementation of these reactions, which are reversible, allowing excellent intestinal digestibility of proteins.

It is also of interest to use the seeds resulting from this invention in the context of feeding by pets. On the one hand, the protein-rich seeds thus prepared provide a diversified and highly digestible source of protein and energy, whose antinutritional factors were reduced and whose protein source has a reduced allergenic potential. Indeed, due to the biochemical reactions at one of the thermal steps of the process, the skilled person knows that the allergen risk is significantly reduced (Franck et al., 2008).

Finally, the use of this process can also be extended to the human food markets because of the nutritional added value that it brings to plant proteins, the human intake of which is currently expected to increase in the diets of populations in developed countries, all the more so as the allergenic risk of these plant proteins is reduced.

It is indeed recommended by France's national food safety agency, ANSES, to restore the balance of protein sources between animal and vegetable proteins in the human diet, and thus to move from a 70/30 ratio to a 50/50 ratio.

The nutritional limits of protein-rich seeds, otherwise known as grain legumes, known in monogastric animals, are the same in monogastric humans. This is why we consider that this invention is ultimately aimed as much at the animal production sectors (monogastric and ruminant) as at the sectors of transformation of plant proteins for direct human consumption.

The bibliographical references cited in this text are detailed below:

Bond., 1976. Journal of Agricultural Science 86, 561-566.
Bourin et al., 2015. JRA.
Carré et al., 1986. J. Sci. Food Agric., 37, 341-351
Carre et al., 2013. Anim. 7, 1246-1258.
Champ et al., 1993. INRA Prod. Anim. 6, 185-198.
Choubert et al., 1982. Aquaculture 29, 185-189.
Crépon et al., 2010. Field Crops Research, 115(3), 329-339.
Cuq et al., 2003. Food Sci Tech, 37, 759-766.
Delanoue et al., 2015. Renc. Rech. Ruminants, 22, 171-178.
Diaz et al., 2006. Italian J. Anim. Sci., 5 (1): 43-53
Dixon et al., 1992. Nutr. Res. Rev., 5: 19-43
Duc et al., 1999. Journ. of Agr. Sci, 133(02), 185-196.
Fru-Nji et al., 2007. The Journal of Poultry Science, 44(1), 34-41.
Garrido et al., 1988. In: Recent adv of rech in antinutritional factors in legume seeds, p. 297-300.
Gatel, 1994. Anim. Feed Sci. Technol. 45, 317-348.
Gatta et al., 2013. Arch. Anim. Nutr., 67 (3): 235-247
Gourdouvelis et al., 2012. Journ Agr Sci and Technology A 2.
Guillaume et al., 1977. British Poultry Science 18, 573-583
Hayashi et al., 1989. A gr. Biol. Chem. 52:2543-2544.
Jezierny et al., 2010. Anim. Feed Sci. Technol. 157, 111-128.
Kaysi et al., 1992. INRA Prod. Anim, 5(1), 3-17.
Keetels, 1995. Landbouwuniversiteit te Wageningen.
Khamassi et al., 2013. Plant Genetic Resources 11, 250-257.
Laplace et al., 1994. Livestock Production Science, 40, 313-328.
Leclercq et al., 1989. INRA Prod. Anim. 2, 129-136.
Lessire, 2001. INRA Prod. Anim. 14, 365-370.
Leterme et al., 1998. Proc. 3rd Int. Workshop on Antinutritional factors in Legume Seeds and Rapeseed. EAAP Publication no. 93, 121-124
Liener et al., 1986. Eds Academic Press, Olando, 600 pp.
Liener, 1979. J. Am. Oil Chemist's Soc., 56, 121-129.
Magrini et al., 2016. Ecological Economics, 126, 152-162.
Messéan et al., 2014. Quae.
Muduuli et al, 1981. Can Jour of Animal Science, 61(3), 757-764.
Muduuli et al., 1982. British Journal of Nutrition, 47, 53-60
Myer et al., 2001. In: Swine Nutrition pp. 1-26.
Noblet et al., 1989. INRA Editions, Paris, 106p.
Olaboro et al., 1981. J Sci Food Agric 32, 1163-1171.
Opazo et al., 2012. PloS one 7, e44783.
Perrot et al. 1995. Inra Prod. Anim., 8 (3): 151-164
Písaříková et al., 2009. Acta Veterinaria Brno 78 (3): 399-409
Saini, 1989. Recent Advances of Research in Antinutritional Factors in Legume Seeds. Pudoc, Wageningen, pp. 329-341
Sauvant et al., 2002: Tables de composition et de valeur nutritive des matières premières destinées aux animaux d'élevage: porcs, volailles, bovins, ovins, caprins, lapins, chevaux, poissons. INRA.
Schmidt et al., 2009. Poult Sci 88, 2610-2619.
Schneider et al., 2017. OCL
Svihus et al., 2005. Anim Feed Sci Technology, 122(3): 303-320.
Svihus, 2006. Avian gut function in health and disease, 28:183-194.
Terres Inovia, 2016. www.terresinovia.fr/feverole/cultiver-de-la-feverole/varietes/print.pdf?print-1, retrieved on 2 Mar. 2017.
Terres Univia, 2016. http://www.terresinovia.fr/fileadmin/cetiom/kiosque/guides_fev erole/guide_Feverole_2016/Feverole_2016_atouts_Terres-Inovia.pdf, retrieved on 20 May 2016.
Terres Univia, 2016. http://www.terresunivia.fr/sites/default/files/articles/publicatio ns/marches/terres-univia-_chiffres-cles-legumineuses.pdf. Retrieved on 20 Mar. 2016.
Terries Inovia, 2016. http://www.terresinovia.fr/debouches-chiffres/transformation-desgraines/usines-et-filieres-courtes/, retrieved on 25 Jun. 2017.
Van Der Poel et al. 1977. In: "Protein quality for leguminous crops"; EUR 5686 EN, p. 162-179.
Zdunczyk et al., 1996. J. Anim. Feed Sci., 5: 281-288
Zuidhof et al., 2014. Poult Sci 93, 2970-2982.
AFNOR 2005. ISO 15914:2004.
Akraïm et al., 2006. Anim. Res. 55, 261-271
Behnke, 2001. Feed Tech, 5(4):19-22.
Benchaar et al., 1992. Première conférence européenne sur les protéagineux, Angers, France, 491-492.
Chesneau et al., 2009. Journ. Rech. Porcine, 41, 63-64.
Enjalbert et al., 2008. Renc. Rech. Ruminants, 15.
Hoseney, 1994. Principles of cereal science and technology. 2.ed. St. Paul: AACC, 1994. 378p.
Hurtaud et al., 2006. Renc. Rech. Ruminants, 13, 332.
M. Champ et al., 1993, 6 (3), pp. 185-198.
Mariotti et al., 2005. Starch-Starke, 57 (11), 564-572
Martin et al., 2008. J Anim Sci. 86 (10): 2642-50
Noblet et al., 2008. Journ. Rech. Porcine, 40, 203-208.
Normand et al., 2005. Renc. Rech. Ruminants, 12, 359-366
Pan et al., 2017. Food Hydrocolloids, 66, 227-236.
Perrot, 1995. INRA Prod. Anim., 8, 151-164
Toullec et al., 1992. Première conférence européenne sur les protéagineux. Angers, France, 497-498.
Wang et al., 2013. Food & Function, 4(11), 1564-1580
Wang et al., 2016. Food & Function, 7(4), 407e-418.
Wang et al., 2017b. Journal of Agricultural and Food Chemistry, 65(1), 156-166
Zhang et al., 2003. Journal of Agricultural and Food Chemistry, 51(9), 2801-2805

The invention claimed is:
1. A process for enhancing the food value of protein-rich seeds, said seeds being selected from at least one of the following proteaginous plant species seeds: fava bean (*Vicia fava* L.), pea (*Pisum sativum* L.), white lupin (*Lupinus albus* L.), blue lupin (*Lupinus angustifolius* L) and yellow lupin (*Lupinus luteus* L), comprising the following successive steps:

a) providing seeds of at least one of the above mentioned plant species, with the proviso that they have a protein content, and/or a starch content, and/or a fat content, of a value greater than or equal to that indicated in the table below, where DM signifies "Dry Matter":

|  | Content higher than | | |
| --- | --- | --- | --- |
| Nutritional Compounds | Protein (g/100 g DM) | Starch (g/100 g DM) | Fat (g/100 g DM) |
| Fava bean Vicia fava L. | 28 | 39 | |
| Pea Pisum sativum L. | 22 | 45 | |
| White lupin Lupinus albus L. | 35 | | 8 |
| Blue lupin Lupinus angustifolius L. | 31 | | 5.5 |
| Yellow lupin Lupinus luteus L. | 38 | | 5.0 | and at least one compound from the following group: antinutritional factor (ANF), crude cellulose, neutral detergent fiber (NDF), present at a level lower than that indicated in the table below:

| Species | ANF/Crude cellulose/NDF | Content less than (g/100 g DM) |
| --- | --- | --- |
| Fava bean Vicia fava L. | Tannins | 0.3 |
| | Vicine, convicine | 0.5 |
| | Alpha-galactosides | 2.5 |
| | Crude cellulose | 10 |
| | NDF | 18 |
| Pea Pisum sativum L. | Tannins | 0.01 |
| | Alpha-galactosides | 5 |
| | Crude cellulose | 7.5 |
| | NDF | 18 |
| White lupin Lupinus albus L. | Alkaloids | 0.1 |
| | Alpha-galactosides | 10 |
| | Crude cellulose | 16 |
| | NDF | 25 |
| Blue lupin Lupinus angustifolius L. | Alkaloids | 0.2 |
| | Alpha-galactosides | 9 |
| | Crude cellulose | 18 |
| | NDF | 29 |
| Yellow lupin Lupinus luteus L. | Alkaloids | 0.3 |
| | Alpha-galactosides | 12 |
| | Crude cellulose | 18 |
| | NDF | 29 | b) pressurizing the seeds from step a) for 10 seconds to 2 minutes at a minimum pressure of 10 bars at a temperature of 80° C. to 160° C.; or b1) dry heating the seeds via dryer, toaster, and/or thermostated screw, for 15 minutes to 2 hours at a temperature of 80° C. to 150° C.

2. The process according to claim 1, wherein, in step b1), the seeds are heated for between 30 minutes and 2 hours.

3. The process according to claim 1, wherein the seeds are heated at a temperature of 90° C. to 150° C.

4. The process according to claim 1, wherein after carrying out said step a), the seeds undergo fractionation.

5. The process according to claim 1, in which seeds of different species and/or of different composition in terms of protein, starch, fat, antinutritional factor, crude cellulose, or neutral detergent fiber (NDF) are provided, wherein after implementation of step a) the seeds are mixed and then fractionated, or are fractionated and then mixed.

6. The process according to claim 1, wherein, prior to step b), a thermal step of preparing the seeds is carried out for a period of 2 minutes to 24 hours with steam and/or a water-based liquid, at a temperature of 30° C. to 90° C. and a humidity of 12% to 60% is obtained.

7. The process according to claim 6, wherein the thermal step of preparing the seeds is carried out until the humidity of the seeds is greater than 15% and/or the period of time is 15 minutes or more.

8. The process according to claim 6, wherein the thermal preparation step is carried out in the presence of at least one exogenous enzyme selected from the following families: arabinofuranosidases, beta-glucanases, cellulases, glucoamylases, pectinases, pectin methyl esterases, phytases, proteases, xylanases and, preferentially, xylanases, beta-glucanases, and pectinases, the exogenous enzyme having been added to the seeds or to a mixture of seeds, prior to the thermal preparation step.

9. The process according to claim 8, wherein the thermal step of preparation in the presence of an exogenous enzyme is carried out with a humidity of more than 15% for at least 15 minutes.

10. The process according to claim 6, wherein when carrying out the thermal preparation step, the mixture is stirred.

11. The process according to claim 5, wherein, after mixing and fractionation of the seeds, mixing of the mixed and fractionated seeds is carried out.

12. The process according to claim 4, wherein fractionation is continued until at least 90% of the seeds have a particle size of less than 2000 micrometers.

13. The process according to claim 5, wherein step b1) is carried out on seeds of different species and/or different composition.

14. The process according to claim 1, wherein implementation of step b) or b1) is discontinued if the content of at least one antinutritional factor in the table below has a value lower than that indicated:

| Species | Nature of the antinutritional factors | Content less than |
| --- | --- | --- |
| Fava bean Vicia fava L. | Lectins (g/100 g raw material) | 0.10 |
| | Antitryptic factors (TIU/mg raw material) | 1.50 |
| Pea Pisum sativum L. | Lectins (g/100 g raw material) | 0.10 |
| | Antitryptic factors (TIU/mg raw material) | 1.50 |

15. The process according to claim 1, wherein, following step a), the seeds are dehulled and/or decoated.

16. The process according to claim 15, wherein after step a) or after having been dehulled and/or decoated, a fractionation and separation of the seeds is carried out according to a criterion chosen from among size, weight, shape, density, an aerodynamic, colorimetric, or electrostatic parameter.

17. The process according to claim 1, wherein following step a), or before step a), sorting of the seeds is carried out according to a criterion chosen from among size, weight, shape, density, an aerodynamic, colorimetric, or electrostatic parameter.

* * * * *